US012598308B1

(12) United States Patent
Rapaka et al.

(10) Patent No.: US 12,598,308 B1
(45) Date of Patent: Apr. 7, 2026

(54) CLUSTER OPTIMIZATION FOR ADAPTIVE BITRATE ESTIMATION

(71) Applicant: Amazon Technologies, Inc., Seattle, WA (US)

(72) Inventors: Krishnakanth Rapaka, Santa Clara, CA (US); Tarek Amara, Pleasanton, CA (US); Ryan Bickhart, San Francisco, CA (US); John Bowers, Provo, UT (US); Sunil Gopal Koteyar, Burlington (CA); Richard Leider, San Francisco, CA (US); Hassan Heidari Namarvar, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 166 days.

(21) Appl. No.: 18/542,126

(22) Filed: Dec. 15, 2023

(51) Int. Cl.
| | |
|---|---|
| *H04N 19/146* | (2014.01) |
| *H04N 19/136* | (2014.01) |
| *H04N 19/154* | (2014.01) |
| *H04N 19/184* | (2014.01) |
| *H04N 19/42* | (2014.01) |
| *H04N 19/50* | (2014.01) |

(52) U.S. Cl.
CPC ......... *H04N 19/146* (2014.11); *H04N 19/136* (2014.11); *H04N 19/154* (2014.11); *H04N 19/184* (2014.11); *H04N 19/42* (2014.11); *H04N 19/50* (2014.11)

(58) Field of Classification Search
CPC .. H04N 19/146; H04N 19/136; H04N 19/154; H04N 19/42; H04N 19/50
See application file for complete search history.

(56) References Cited

U.S. PATENT DOCUMENTS

| | | | |
|---|---|---|---|
| 11,153,585 B2 | 10/2021 | Katsavounidis et al. | |
| 12,225,252 B2 | 2/2025 | Liu et al. | |
| 2022/0239720 A1* | 7/2022 | Madanapalli | ....... H04L 47/2483 |
| 2023/0179800 A1 | 6/2023 | Menon et al. | |
| 2023/0388511 A1 | 11/2023 | Menon et al. | |

(Continued)

OTHER PUBLICATIONS

Abbas, A., "Introducing VMAF percentiles for video quality measurements," X Engineering, Webpage, Nov. 9, 2020, pp. 1-8, https://blog.x.com/engineering/en_us/topics/infrastructure/2020/introducing-vmaf-percentiles-for-video-quality-measurements Accessed: Jul. 10, 2024.

(Continued)

*Primary Examiner* — On S Mung
(74) *Attorney, Agent, or Firm* — Weaver Austin Villeneuve & Sampson LLP

(57) ABSTRACT

Techniques and systems for adaptive optimization of clusters for bitrate prediction are disclosed. In some embodiments, such techniques may include extracting, in real-time, features from content segments of a video stream; identifying superclusters representing optimal bitrates for the content segments of the live video stream based on a mapping of the features to superclusters generated by one or more trained machine learning models, the identified superclusters configured to maintain a quality level associated with the content segments; assigning a subcluster between the identified superclusters; and applying bitrates associated with the identified superclusters and the subcluster to the video stream.

20 Claims, 19 Drawing Sheets

(56)        References Cited

U.S. PATENT DOCUMENTS

2024/0305788 A1      9/2024   Liu et al.

OTHER PUBLICATIONS

Bjontegaard, G., "Bd Rate," Glossary Definition, 2001, Webpage https://vicuesoft.com/glossary/term/bd_rate/ Accessed: Jul. 10, 2024, 1 pages.

"I-Frame / GOP / GOV," Restreamer, Wikipedia Definition, Webpage, 1 page. https://datarhei.github.io/restreamer/wiki/iframe.html Accessed: Jul. 10, 2024.

Netflix Technology Blog, "Per-Title Encode Optimization," Medium, Webpage, Dec. 14, 2015, pp. 1-18, https://netflixtechblog.com/per-title-encode-optimization--7e99442b62a2 Accessed: Jul. 10, 2024.

Ozer, J., "Encoding Ladders: What You Need to Know," Wowza, Aug. 23, 2022, pp. 1-6. https://www.wowza.com/blog/encoding-ladders-what-you-need-to-know Accessed: Jul. 10, 2024, 6 pages.

Ozer, J., "The Evolving Encoding Ladder: What You Need to Know," Streaming Learning Center, Webpage, May 27, 2019, pp. 1-6, https://streaminglearningcenter.com/learning/the-evolving-encoding-ladder-what-you-need-to-know.html Accessed: Jul. 10, 2024, 6 pages.

Ramano III, F., "A Quick Introduction to I-frames & GOP in Video Codecs," Vanilla Video, Webpage, Mar. 26, 2012, 1 page. https://vanillavideo.com/articles/quick-intro-i-frames-gop-video-codecs/ Accessed: Jul. 10, 2024.

Samins, B., "Back to basics: GOPs explained," AWS, Webpage, May 28, 2020, 14 pages. https://aws.amazon.com/blogs/media/part-1-back-to-basics-gops-explained/ Accessed: Jul. 10, 2024.

Shannon, C., "Rate-distortion theory," Wikipedia Definition, Webpage, pp. 1-6, https://en.wikipedia.org/wiki/Rate%E2%80%93distortion_theory Accessed: Jul. 10, 2024.

U.S. Appl. No. 18/542,120, inventor Rapaka K, filed Dec. 15, 2023.

U.S. Non-Final Office Action dated Apr. 1, 2025 in U.S. Appl. No. 18/542,120.

U.S. Notice of Allowance dated Aug. 26, 2025 in U.S. Appl. No. 18/542,120.

* cited by examiner

Resolution 1
Resolution 2
Resolution 3
Resolution 4
Resolution 5
Actual

302

304

306

308

310

Distortion Metric

Bitrate

600
Online Flow

602

Input Video

604
Content Segments

611
Trained Model(s)

610
Rate Estimation Engine (REE)

612
Feature Extraction

614
ML-based Cluster Prediction

616
Optimal Encoding Settings/Ladder(s) for Content Segments

Figure 12:
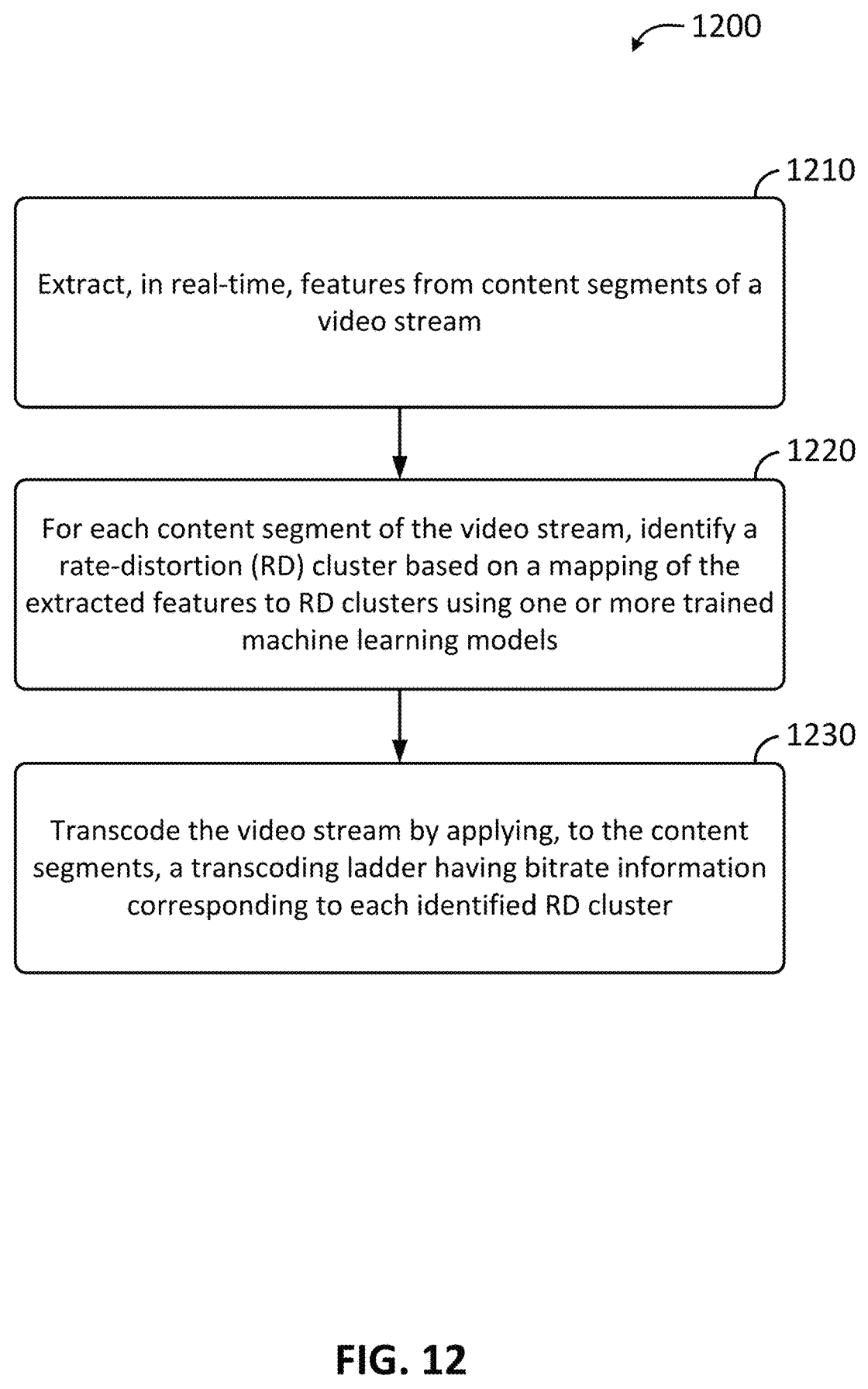

1200

1210

Extract, in real-time, features from content segments of a video stream

1220

For each content segment of the video stream, identify a rate-distortion (RD) cluster based on a mapping of the extracted features to RD clusters using one or more trained machine learning models

1230

Transcode the video stream by applying, to the content segments, a transcoding ladder having bitrate information corresponding to each identified RD cluster

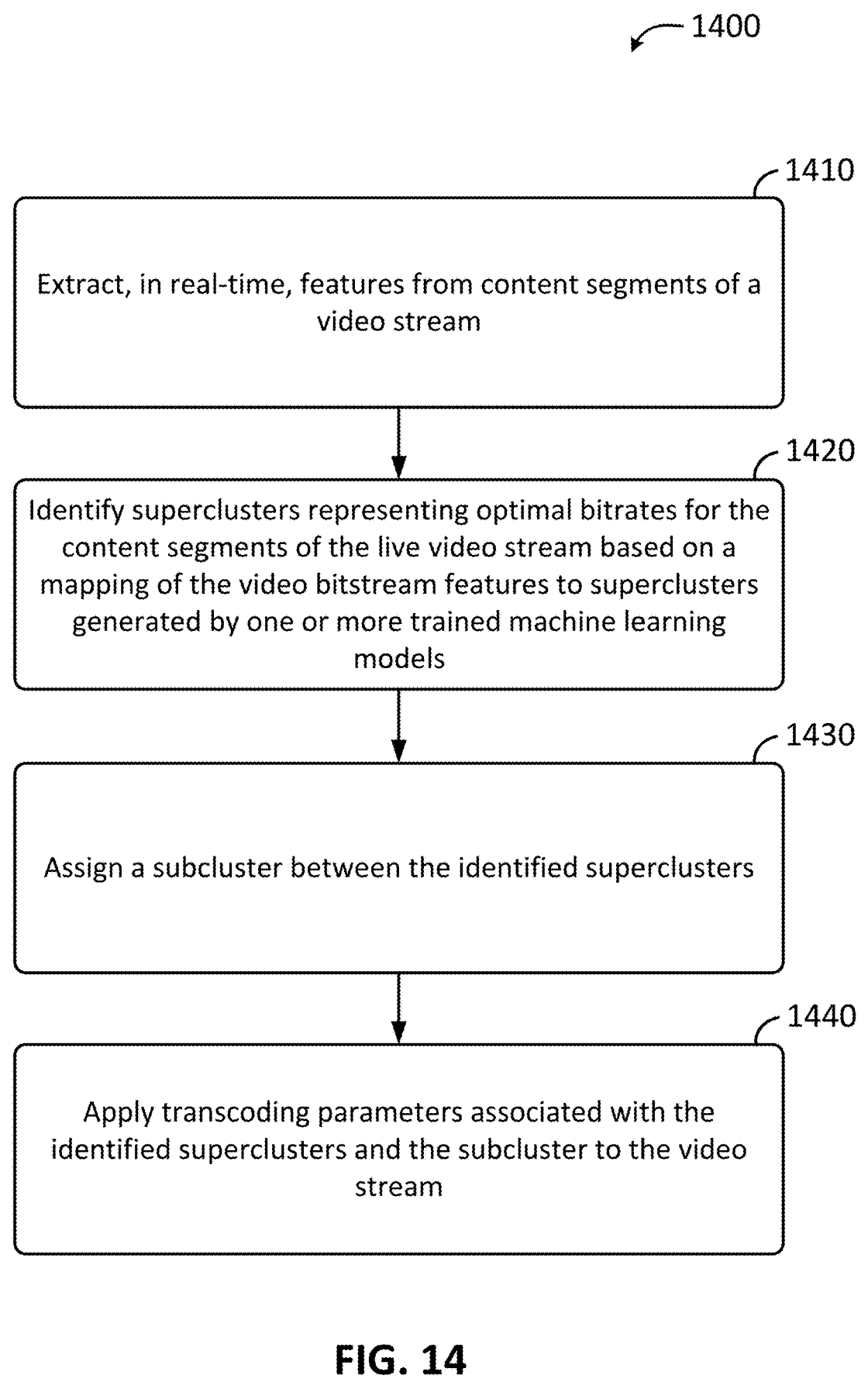

Extract, in real-time, features from content segments of a video stream

1420

Identify superclusters representing optimal bitrates for the content segments of the live video stream based on a mapping of the video bitstream features to superclusters generated by one or more trained machine learning models

1430

Assign a subcluster between the identified superclusters

1440

Apply transcoding parameters associated with the identified superclusters and the subcluster to the video stream

FIG. 14

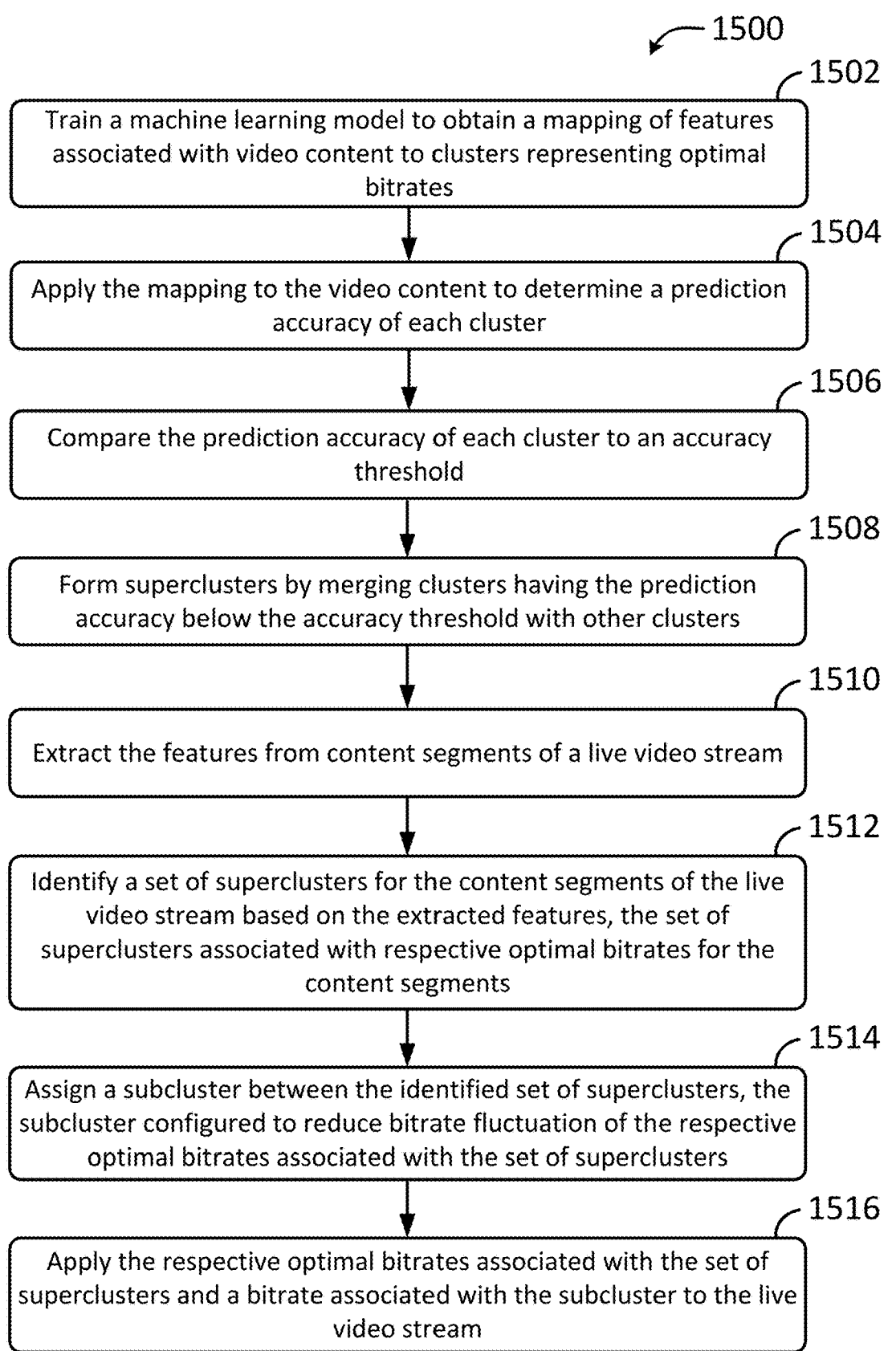

1500

1502

Train a machine learning model to obtain a mapping of features associated with video content to clusters representing optimal bitrates

1504

Apply the mapping to the video content to determine a prediction accuracy of each cluster

1506

Compare the prediction accuracy of each cluster to an accuracy threshold

1508

Form superclusters by merging clusters having the prediction accuracy below the accuracy threshold with other clusters

1510

Extract the features from content segments of a live video stream

1512

Identify a set of superclusters for the content segments of the live video stream based on the extracted features, the set of superclusters associated with respective optimal bitrates for the content segments

1514

Assign a subcluster between the identified set of superclusters, the subcluster configured to reduce bitrate fluctuation of the respective optimal bitrates associated with the set of superclusters

1516

Apply the respective optimal bitrates associated with the set of superclusters and a bitrate associated with the subcluster to the live video stream

FIG. 15

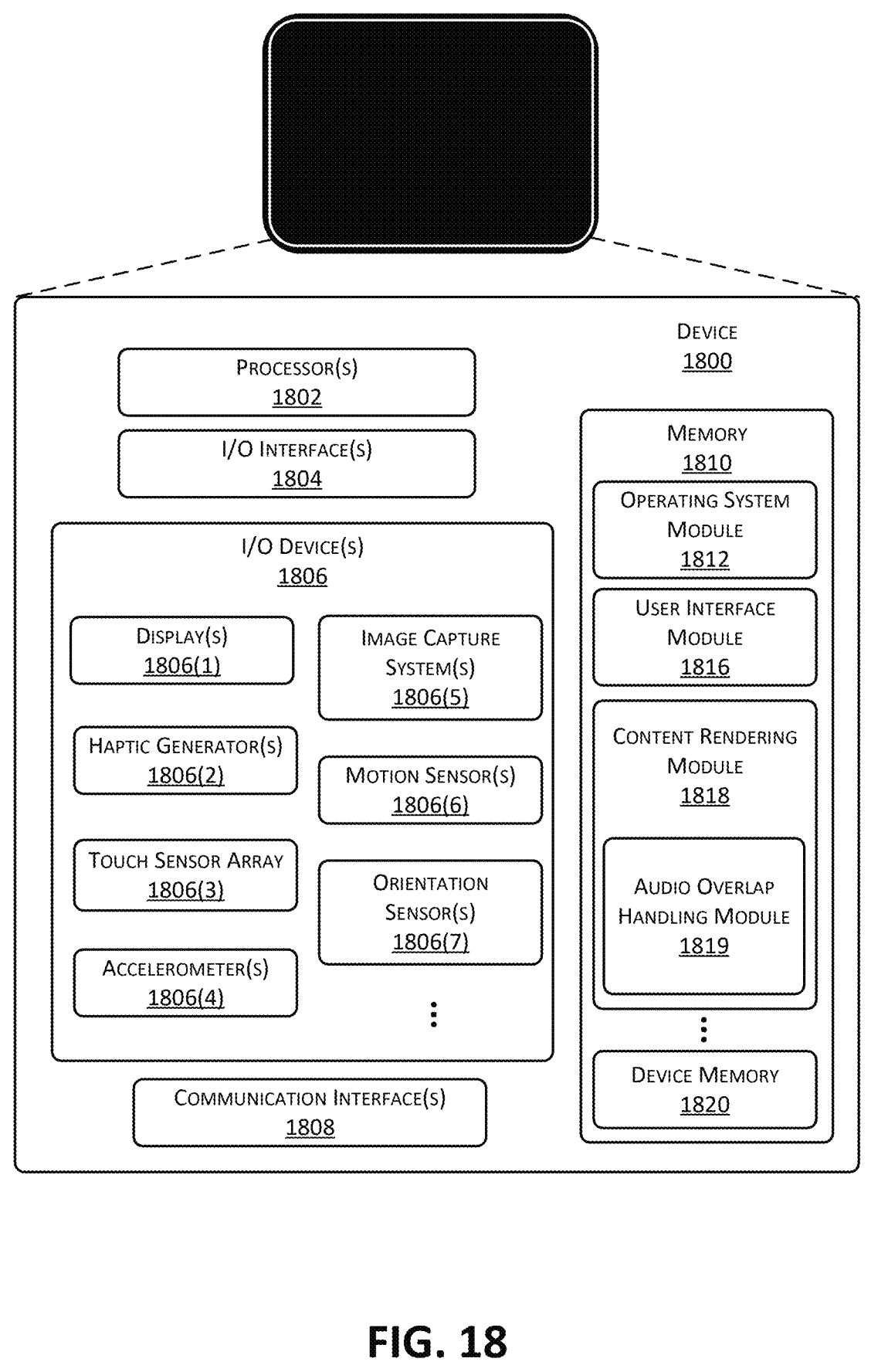

DEVICE
1800

PROCESSOR(S)
1802

I/O INTERFACE(S)
1804

I/O DEVICE(S)
1806

DISPLAY(S)
1806(1)

IMAGE CAPTURE
SYSTEM(S)
1806(5)

HAPTIC GENERATOR(S)
1806(2)

MOTION SENSOR(S)
1806(6)

TOUCH SENSOR ARRAY
1806(3)

ORIENTATION
SENSOR(S)
1806(7)

ACCELEROMETER(S)
1806(4)

⋮

COMMUNICATION INTERFACE(S)
1808

MEMORY
1810

OPERATING SYSTEM
MODULE
1812

USER INTERFACE
MODULE
1816

CONTENT RENDERING
MODULE
1818

AUDIO OVERLAP
HANDLING MODULE
1819

⋮

DEVICE MEMORY
1820

FIG. 18

CLUSTER OPTIMIZATION FOR ADAPTIVE BITRATE ESTIMATION

BACKGROUND

Video encoding techniques are highly concerned with maintaining quality of content while minimizing data size of the content. Bitrate is one parameter that affects the quality of playback. Constant bitrate (CBR) refers to a constant rate of outputting encoder data or transmitting encoded data. Variable bitrate (VBR) encoding enables transmission at a variable rate, e.g., depending on the complexity of the content which can vary significantly within the content or across different contents. Determining an optimal bitrate for a particular content to be delivered would allow that content to be provided with an optimal balance of quality, size, and encoding costs.

BRIEF DESCRIPTIONS OF DRAWINGS

FIG. 12 illustrates a method of adaptive bitrate optimization for content delivery, according to some embodiments.

FIG. 14 illustrates a method for adaptive optimization of clusters for bitrate prediction, according to some embodiments.

FIG. 15 illustrates another method for adaptive optimization of clusters for bitrate prediction, according to some embodiments.

FIG. 18 is a block diagram of an example of a user device suitable for use with various embodiments discussed herein.

DETAILED DESCRIPTION

Figure 1:
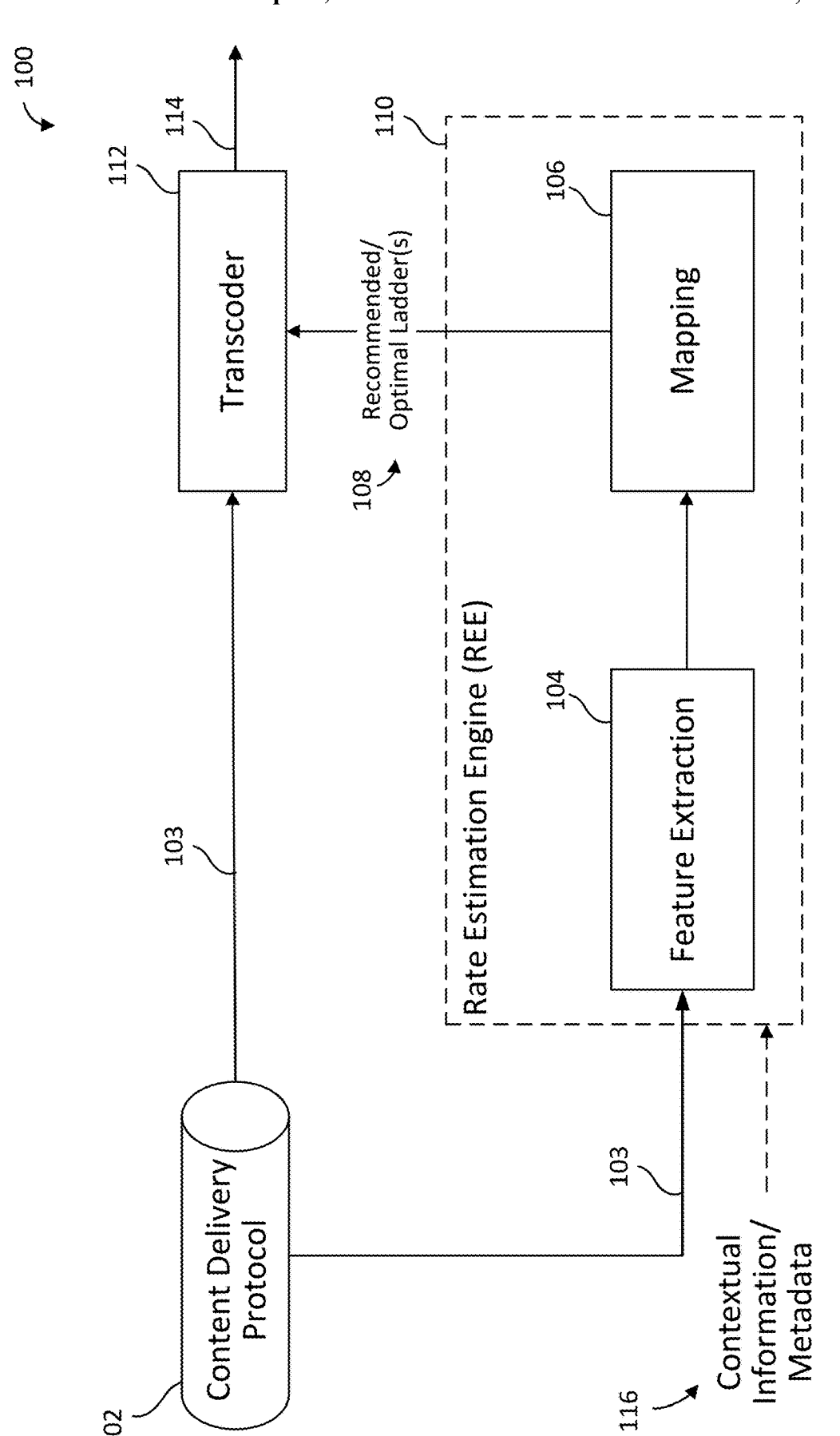
FIG. 1 is a block diagram of an example transcoder flow of a content delivery system incorporating a Rate Estimation Engine (REE), according to some embodiments.

There are advantages to using different approaches to encoding such as CBR and VBR. As one example, CBR is better for time-sensitive streaming, ensuring compatibility across devices, and producing consistent results. However, VBR is more suitable for addressing varying complexity within content and producing higher-quality video streams. Either encoding method can involve creating or transcoding copies of different renditions of a content or a segment thereof, each rendition having its own resolution and/or quality, so that end users and players can retrieve a rendition appropriate for the device or scenario.

However, a one-size-fits-all approach for encoding would result in a suboptimal tradeoff between quality and cost of encoding. For example, encoding a less-complex content (e.g., talking heads) and complex content (e.g., high-motion games or action movies) at the same bitrate may result in inefficient use of computational resources (e.g., unnecessary cost of encoding into a larger resolution than needed) and/or cause artifacts in higher-definition devices (e.g., if encoded into a small resolution and upscaled at the receiving device). In addition, consumer bandwidth may be a further bottleneck that results in wasteful encoding.

As resolution sizes, consumption of video content, and consumer expectations continue to increase, encoders strive to meet these demands more efficiently. As user-generated content becomes more widely demanded and consumed, one illustrative example scenario that would benefit from optimizing bitrate and quality of content is live streaming of video content. Live streaming systems can face constraints in computational capabilities (e.g., of underlying hardware) and/or network bandwidth during real-time operations and decisions (e.g., bitrate determinations). Streaming live content while requiring less bandwidth to provide a better user experience can be made possible with optimization of bitrate and quality.

To these ends, the following description is directed to techniques for adaptively optimizing content, including, for example, live streamed video content. In some implementations, machine learning and training on content may be utilized to optimize the bitrate of online or live content such as live streams. A lightweight machine learning model may be employed for efficient prediction with respect to live content. However, the present disclosure is not so limited and may be implemented with various types of content delivery, contexts, and use cases, including video-on-demand (VOD) content, real-time encoding of VOD or live content, audio content (e.g., podcasts) whether on-demand or live.

Examples of a lightweight machine learning model may include a model that has a small memory footprint, low computational requirements, and/or is efficient in terms of both training and inference. The lightweight model is resource-efficient and can be suitable for deployment on devices with limited computational power, such as mobile devices, edge devices, or IoT (Internet of Things) devices. Using a lightweight model can provide several advantages, including: (1) consuming less memory and computational resources, making it suitable for deployment in environments with constraints on hardware resources; (2) having faster inference times, enabling quicker responses in real-time applications; (3) requiring less power to perform computations (e.g., where energy consumption is a consideration, such as battery-operated devices); and/or (4) running efficiently on edge devices, bringing the computation closer to the data source and reducing the need for constant communication with a central server.

Rate Estimation Engine (REE)

As used herein, an "online" portion of a system or an "online flow" may refer to a component or a portion of a system configured for data communication with a content delivery system such that live content can be received and processed, and in some cases, deliver processed live content to end users. An online flow may be useful for time-sensitive tasks, real-time or near real-time processing. An "offline" portion of a system or an "offline flow" may refer to a component or a portion of a system that may be in data communication with the online portion and/or other portions of a content delivery system but may not necessarily be performed during a live session or stream (e.g., to provide content directly to an end user). An offline flow may be useful for non-time-sensitive tasks or acceptably delayed responses, including batch-processed tasks that allow decisions to be made on a set of content.

As used herein, a "module" may refer to at least a portion of computer-executable instructions. In some embodiments, a module may be implemented by a hardware processor configured to execute the corresponding computer-executable instructions. A hardware processor may be an integrated circuit device associated with a computing device, such as a server or a user device (e.g., a desktop computer, a laptop computer, a tablet computer, a mobile phone, or the like), which is programmable to perform specific tasks. In some embodiments, multiple modules may be implemented as a single module. In some embodiments, a single module may be implemented as multiple modules. In some embodiments, two or more modules may be executable by the same device (e.g., the same server, the same computing device).

As used herein, "real-time" may refer to one or more of the following. "Real-time" in some contexts may mean that the task or action is performed as instantaneously as possible, where, in some cases, the action may be limited by one or more factors, e.g., the ability to receive the input data (e.g., module or device capability, network bandwidth, the timeframe in which a processing system receives and processes the input data), the ability of the hardware or software performing the action to receive or access the data, perform the processing or transformation, or other constraints. "Real-time" in some contexts may alternatively or additionally mean that the action is performed immediately, as it happens. For example, in the context of a system that processes data, such a system may process the data as it is received, as opposed to storing, buffering, caching, or otherwise persisting the data as it is received and processing the data later on. "Real-time" in some contexts may alternatively or additionally mean processing or transforming data without intentional delay, given the processing limitations of a system or its module(s) and the time required to accurately receive the data. "Real-time" in some contexts may alternatively or additionally mean processing or transforming data fast enough to keep up with an input data stream. That is, real-time processing or transforming of the input data may be performed or completed at least as fast as the rate of receipt of the input data.

In some specific embodiments of the present disclosure, a Rate Estimation Engine (REE) may refer to one or more components or modules of a content delivery system configured to obtain content (e.g., video data, audio data, or portions thereof received or accessed from a device) and generate transcoded or encoded content or information regarding the same (e.g., encoding ladders). In some implementations, the REE may be implemented in an online portion of a content delivery system configured to receive and process live content as well as communicate with offline (or other) portions, e.g., to exchange training data and results. The REE may be implemented with content encoding and/or transcoding processes in the online flow.

FIG. 1 is a block diagram of an example transcoder flow of a content delivery system 100 incorporating a Rate Estimation Engine (REE) 110, according to some embodiments. In some configurations, a content delivery protocol 102 may provide content (e.g., video stream, audio stream, segments thereof) via an input stream 103 to a transcoder 112 of the content delivery system 100. In some implementations, the content delivery protocol 102 may be a live Real-Time Messaging Protocol (RTMP). RTMP may refer to a live streaming protocol that maintains a low-latency and persistent connection for video and/or audio (e.g., live television, live streaming, Internet phone services) configured to transfer data over a data communication system such as the content delivery system 100. In other implementations, the content delivery protocol 102 may be another live or real-time streaming protocol, e.g., Real-Time Streaming Protocol (RTSP), HTTP (Hypertext Transfer Protocol) Live Streaming (HLS), Dynamic Adaptive Streaming over HTTP (MPEG-DASH), WebRTC, Secure Reliable Transport (SRT), or other streaming communications protocols. In some cases, video may have been compressed based on Advanced Video Coding (AVC), also referred to as H.264, or other formats such as High Efficiency Video Coding (HEVC), AOMedia Video 1 (AV1), or Versatile Video Coding (VVC).

In some embodiments, the transcoder 112 may be in data communication with a mapping module 106. In some configurations, the mapping module 106 may be coupled to a feature extraction module 104, both of which may be part of the REE 110. The feature extraction module 104 may also receive the input stream 103, and features associated with the content may be extracted. Features may refer to parameters of the content in the input stream 103, e.g., a quantization parameter (QP), an original bitrate, an original resolution, a motion vector, and/or coded block pattern information. In some cases, extracted features may include a type or a category of video (which may be live streaming video) as chosen or provided by a viewer or end user. Examples of such content type or category include a chat session (may have low motion with few talking heads), a lecture (may have low or medium motion), a group video watching session (may have low, medium, or high motion), a gaming session (may have low, medium, or high motion). Categorizing the video may increase the certainty of transcoding and encoding needs. While the input to the REE may be extracted from the input stream 103 itself (e.g., by feature extraction module 104) and represented by a set of features, at least some features or information about the features (e.g., content type) may be provided as contextual information or metadata 116 to the REE 110.

An online flow or process, by virtue of its time-sensitive nature, may not be able to exploit the extensive features that may otherwise be available to an offline flow or process, such as a ground truth feature set for training a machine learning model as will be described in further detail below. Hence, in some embodiments, a set or subset of features may be extracted for the online flow, considering the aforementioned computational constraints of underlying hardware. In some approaches, the features used by the REE can become augmented features that are obtained by combining the extracted features from the input stream. In these approaches, features being extracted or that have been extracted may be processed through one or more of the following stages. First, extracted features may be identified as a set or subset of bitstream syntax elements such as a quantization matrix averaged at N×N (e.g., 8×8 blocks). In some cases, features may be chosen based on availability of computational resources. For example, features may be picture-level features and/or block-level features without temporal dependency (e.g., quantization). In other examples, features may be block-level features with temporal dependency (e.g., motion vectors), transform coefficient-level features (e.g., coded block patterns (CBP), residual information), pixel-level information, and/or global features (e.g., convex hull optimized). Second, the limited set of features for online process may be enhanced to capture higher-level information. This can improve adaptability and responsiveness to user interactions, e.g., during live streaming. In some approaches, the features extracted from the bitstream in the first stage may be enhanced using a statistical fitting such as a linear fitting or a polynomial fitting of features to generate augmented features. For example, an augmented feature $F_{aug1}$ can be represented as $F_{aug1}=a*F_1+b*F_2$ or $F_{aug1}=a*F_1+b*F_{22}$ in which $F_1$ and $F_2$ are two of the extracted bitstream features subset. $F_{aug1}$ is thus a new, augmented feature generated from two features. Different augmented features can be generated from different combinations of the extracted features. Although this example uses a polynomial fit of order 2, higher orders of polynomial fitting can be used. Additionally, to limit the number of features strategically, techniques such as principal component analysis (PCA) can be employed to keep the augmented features commensurate with computational capabilities, balancing tradeoffs among accuracy, computational efficiency, and complexity in the online flow of the live streaming system. Third, the augmented features in the second stage may be pruned based on a ranking mechanism such that, for example, the top X (e.g., top 30) or top X % (e.g., top 20%) of the augmented features that have the most contribution to prediction accuracy or decision process (e.g., optimal bitrate) are kept.

In some configurations, the mapping module 106 may map the extracted features with an optimal bitrate. The mapping may be determined by one or more model(s) that is trained to map a given content segment with an optimal bitrate, as will be described further below.

In the embodiments described herein, the REE 110 may be capable of feature extraction and mapping as described above, and may be added to the content delivery system 100 to continuously decide and communicate the optimal bitrate 108 for the input content video and pass it to the transcoder 112. Based on the optimal bitrate, the transcoder 112 may generate an output 114, which may include a transcoded output corresponding to an optimal (recommended) bitrate for the inputted content via the input stream 103.

In some embodiments, REE 110 can also be used to predict optimal transcoder ladders that include optimal combinations of bitrates, resolutions, and/or codecs. Using similar techniques described herein, optimal encoding settings (e.g., quantization parameters, group of picture (GoP) sizes, etc.) can also be predicted.

Figure 2:
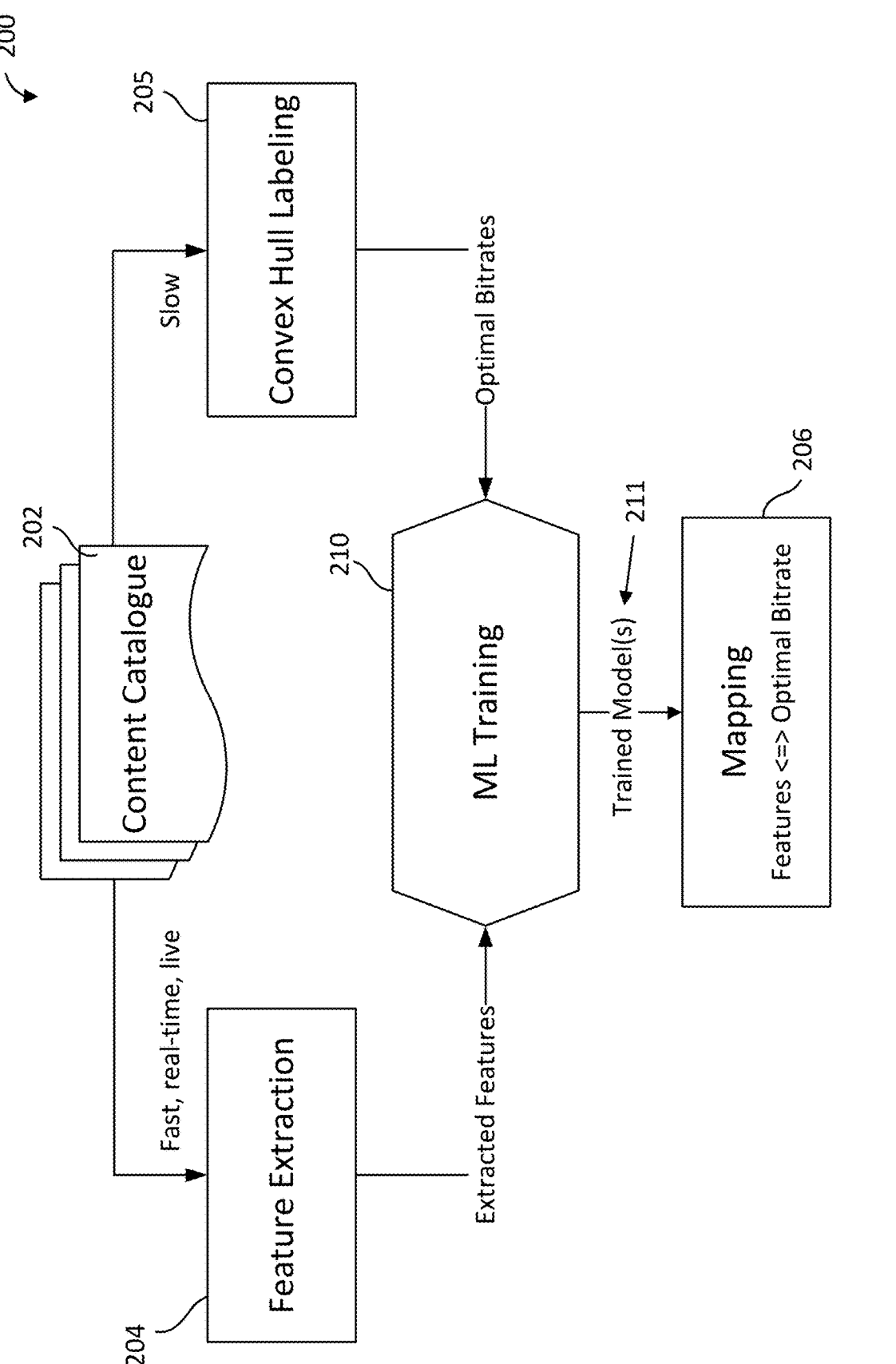
FIG. 2 is a block diagram illustrating an example process to build a model that maps an optimal bitrate to a set of features extracted from ingested content, according to some embodiments.

FIG. 2 is a block diagram illustrating an example process 200 to build a model that maps an optimal bitrate for content to a set of features extracted from ingested content 200, according to some embodiments. In some implementations, the example process 200 may be performed by one or more process(s) or a training module (not shown) via an offline process. That is, the example process 200 may be performed outside of a live stream. That is, it may be performed to prepare a trained model that can perform mapping with respect to content ingested from a live stream.

In some embodiments, a set of content 202 may be retrieved or otherwise obtained by the processor(s) from a content catalogue, repository, or other storage, which may be a local storage directly communicatively coupled to the processor(s), or it may be a remote storage (e.g., a server within or outside the content delivery system). The set of content 202 may include segments or chunks of content, e.g., segments of a video. The set of content 202 may be, for example, stored video content that is served to end users, stock video footage (which may or may not be available to end users), or other training data unavailable for delivery to end users.

In some embodiments, feature extraction 204 may be performed on the set of content 202. The features may include one or more parameters such as QPs, original bitrates, original resolutions, motion vectors, and/or coded block pattern information extracted from the set of content 202. In some implementations, the extracted features may be augmented by selecting the top features as noted above. In some embodiments, convex hull labeling 205 may be performed.

Figure 3A:
FIG. 3A shows a graph depicting an example set of rate-distortion (RD) curves of a single asset encoded at different resolutions and bitrates.

To illustrate convex hull labeling, FIG. 3A is a graph 300 depicting an example set of rate-distortion (RD) curves of a single asset encoded at different resolutions and bitrates. RD curves may relate bitrate to quality of content. Bitrate may be measured by kilobits per second (kbps). Content quality may be indicated using a distortion metric. One example of a distortion metric (or video quality metric) is peak signal-to-noise ratio (PSNR), which is the ratio between the maximum possible value of a signal and the distorting noise that affects the quality of its representation. Some other examples of the distortion metric include Video Multimethod Assessment Fusion (VMAF), structural similarity index measure (SSIM), PSNR-HVS (an extension of PSNR that incorporates properties of the human visual system (HVS) such as contrast perception), aligned PSNR (APSNR), overall PSNR, and other off-the-shelf metrics. Another distortion metric is the Bjontegaard delta rate (BD rate), which measures bitrate differences between two RD curves, and thus indicative of bitrate reduction offered by a codec while maintaining the same quality.

In the graph 300 of FIG. 3A, several bitrate-quality curves are shown. For a given segment of content encoded at a respective resolution (480p, 720p, 1080p, etc.), distortion metric (e.g., PSNR) as a measure of video quality is determined as a function of bitrate. RD curves 302, 304, 306, 308 and 310 each represent a different resolution. RD curve 302 has the highest resolution and is associated with higher bitrates and quality (distortion metrics), while RD curve 310 represents the lowest resolution. For each resolution, the quality of the encode may increase with the bitrate but may start plateauing above some threshold of bitrate. Intuitively, every resolution has a limit to the perceptual quality it can produce. In contrast, even higher-resolution encodes may have lower quality than a lower-resolution encode at the same bitrate, since encoding more pixels at higher resolution with lower quality or precision can produce a worse picture than encoding fewer pixels with more precision, not to mention there may not be sufficient encoding resources for a higher bitrate at higher resolution, resulting in artifacts. Hence, each resolution may be associated with bitrates at which it outperforms at least one other resolution.

Figure 3B:
FIG. 3B shows a graph depicting an example curve representing a convex hull for the example RD curves of FIG. 3A.

FIG. 3B is a graph 310 showing an example of an additional curve 312 over RD curves 302-310. Example curve 312 represents a convex hull for the RD curves. A convex hull may refer to a single boundary formed based on several bitrate-quality curves, e.g., the RD curves 302-310 shown in FIGS. 3A and 3B. It may be considered an ideal curve to perform encoding. An encoder may endeavor to select bitrate-resolution pairs that are as close to the convex hull (e.g., curve 312) as possible.

In some approaches, a quality score or a value between a lower limit (e.g., 0) and an upper limit (e.g., 10) may be assigned to content or a content segment as an indicator of quality, from worst to best quality (or vice versa). However, a mean score aggregated across sequences and frames with a sequence can thus lead to a biased and incorrect interpretation of the overall quality. For example, a few simple content frames that have very large VMAF scores can aggressively push the average VMAF scores higher, which is contrary to subjective quality assessment. It can also be observed that even few poor-quality regions disproportionately and negatively affect a subjective assessment of the video quality. In some configurations, the scale may not be linear. For instance, a one-level degradation from 10 to 9 may not be the same indication of degradation as 6 to 5, further skewing the interpretation of the quality.

To assess the content more objectively using a single score from a visual quality point of view, the distortion metric may be a percentile-based quality score or cumulative metric. In some implementations, the quality level according to this cumulative distortion metric may be described as shown in Eqn. 1:

$$\text{Quality\_Level} = \Sigma_{seq}(w \cdot H(\text{vmaf}_{k_i = [10,25,50,75]})) \qquad \text{(Eqn. 1)}$$

Here, after calculating VMAF scores of relevant frames of interest, $\text{vmaf}_{k_i}$ is the VMAF percentile at varying percentiles (e.g., $10^{th}$, $25^{th}$, $50^{th}$, $75^{th}$). For example, the $10^{th}$ percentile score would be a VMAF score of the worst 10% of frames, and the $50^{th}$ percentile score would be the median. H determines the harmonic mean (reciprocal of the arithmetic mean of the reciprocals) of $\text{vmaf}_{k_i}$. w is a weight factor to assign the contribution of each percentile to be considered for the final cumulative score. For example, if w is set to "2" for the $10^{th}$ percentile and "1" for the $25^{th}$, $50^{th}$, and $75^{th}$ percentiles, it indicates that the VMAF score at the $10^{th}$ percentile has twice the impact on the overall quality level compared to the scores at the other percentiles. w may be normalized to 1. The weighted harmonic means may be averaged across sequences in the catalogue as necessary to obtain a single cumulative distortion metric.

In some approaches, a quality score as described above may be used as the distortion metric, as will be discussed with respect to FIG. 8 below after relevant discussions.

Returning to FIG. 2, in some embodiments, the convex hull labeling 205 may determine an optimal bitrate for a given content of the set of content 202, e.g., based on the bitrate that is closest to the convex hull (e.g., a curve similar to curve 312). In some cases, feature extraction 204 may be faster and able to be performed in real-time compared to convex hull labeling 205, which analyzes video quality for different bitrates at different resolutions. This is a salient difference in computational speed and resources needed which drives the allocation of feature extraction 204 and convex hull labeling 205 to online and offline flows, respectively.

In some embodiments, a model may be trained and generated via a training procedure 210, e.g., using machine learning (ML). Training may be performed offline (e.g., prior to online implementation) so as to conserve online computational resources. In fact, much of the high-complexity tasks are pushed to an offline path, including training and convex hull-based ladder clustering (both of which will be described in more detail below). The online path is more suitable for lightweight extraction of features and ML-based mapping to the offline trained clusters.

During training, the ML model may receive as input, for a given content segment or at least portion of content, (1) extracted features from feature extraction 204 and (2) optimal bitrates from convex hull labeling 205. In some implementations, the input features may be augmented features (e.g., top N features based on significance or importance). In training the ML model, an unsupervised learning method or a supervised learning method may be used.

In a supervised learning method, labeled training data, or ground truth data, may also be provided, e.g., a cluster index that indicates clusters of encoding ladders, where each encoding ladder maps input features to optimal bitrates. A loss function can be used with respect to predicted output mapping information (e.g., optimal bitrates). For example, gradient descent can be implemented to minimize the loss (error) of the predicted output. Error in this case can be defined as the difference or distance between (i) the predicted mapping between extracted features and optimal bitrates and (ii) the ground truth mapping between features and optimal bitrates. In some implementations, the loss function can be configured or targeted toward different optimizations (e.g., optimal resolutions, or optimal bitrate-resolution pairs).

In an unsupervised learning method, unlike supervised learning, unlabeled data are given to the ML model being trained. The ML model is allowed to identify patterns and groupings without any explicit instruction or ground truth. In this case, unsupervised learning may result in clustering of encoding ladders. In some implementations, K-means clustering may be used to divide or group encoding ladders into clusters that share similarities (e.g., similar bitrate-quality pairs) and are dissimilar to the ladders in other clusters. K is an input referring to how many clusters are desired. First, K number of random centroids are assigned, and then the distance between each of the randomly assigned centroids and the data points are determined. A given data point is assigned to the centroid to which it has the least distance. The actual centroids may then be determined and repositioned until convergence. The final centroids may be useful in downstream usage of the trained ML model.

In some implementations, optimization settings such as stochastic gradient descent optimizer, learning rate decay, L2 parameter regularization, momentum, and/or early stopping based on a validation set (a portion of the training data, e.g., 20% set aside for validation) may be set and/or adjusted to achieve convergence and optimal loss minimization.

In other implementations, other supervised or unsupervised training may be performed for classification, including nearest-neighbor or random-forest approaches. An ensemble of multiple models in conjunction may also be implemented.

Once a trained model 211 is generated via the training procedure 210, mapping 206 may become possible, e.g., mapping of features extracted from live content with an optimal bitrate using mapping module 106 of the REE. In some implementations, the trained model 211 may be a multilayer perceptron ML model. In some approaches, more than one trained model may be generated. In the context of the present disclosure, reference to the trained model 211 may be a reference to one or more trained models.

As an aside, the training procedure 210 may be part of a broader endeavor of optimizing quality-driven bitrate and bandwidth allocation for video content delivery, where one or more of the following may be performed. First, finding an optimal ML model for a given data set may be set as an objective. Then, a dataset may be generated, creating a dataset specifically suited to capturing essential features for predicting quality-driven bandwidth allocation. Pre-processing may be performed on the data, refining the dataset, e.g., through imputation, removal, and/or feature scaling. Then, feature engineering and selection may involve identifying and selecting pertinent features for training and testing a model. A range of ML algorithms, including supervised, unsupervised, ensemble, and nearest-neighbor approaches, can be explored. To this end, training and evaluation via iterative cycles of training models, tuning parameters, and evaluating performance against predefined metrics can be performed, e.g., via training procedure 210. Ongoing refinement of the model (e.g., trained model 211) can be done based on evaluation results and outputs to improve prediction accuracy and effectiveness of the model.

Figure 4:
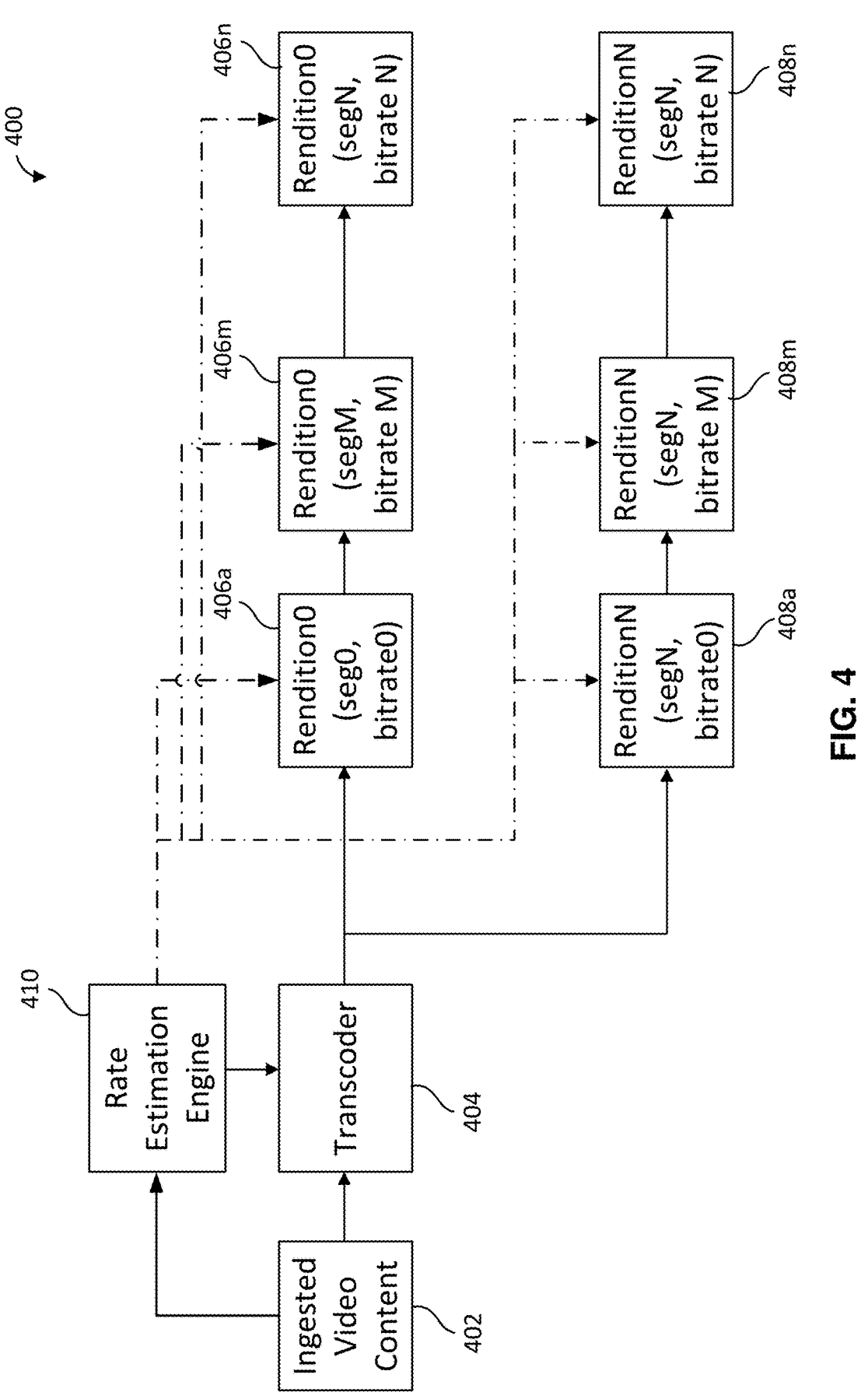
FIG. 4 is a block diagram illustrating a high-level implementation of an REE with a content delivery system, according to some embodiments.

FIG. 4 is a block diagram illustrating a high-level implementation of an REE 410 with an example content delivery system 400, according to some embodiments. In some embodiments, the example content delivery system 400 may include a transcoder 404 configured to decode ingested content 402 such as video segments or chunks received via the example content delivery system 400 (e.g., via content delivery protocol 102, which may be a live streaming protocol as discussed above. In some implementations, transcoder 404 may include a decoder, a scaler, an encoder, or a combination thereof. As such, in some implementations, decoding with the transcoder 404 may include rescaling, e.g., downscaling or upscaling, according to an encoding ladder. Decoding and rescaling may result in copies of the ingested content 402 having different bitrates, different resolutions, different features (e.g., quantization parameters), etc. That is, transcoder 404 may be configured to perform a process that includes decoding and re-encoding of ingested content, whether one rendition or multiple renditions.

By adding the REE 410 to the transcoding process, optimized renditions of the ingested content 402 can be produced on a segment-by-segment basis. As an illustrative example, features may be extracted from segments of the live content by the REE 410. The REE 410 may include and implement a trained model (e.g., 211) on the extracted features to determine optimal bitrates for each segment. The trained model 211 is trained offline and is configured to map optimal bitrate configurations to the features of the content segment. Based on the optimal bitrates, the transcoder 404 may generate a set of renditions for each segment. For example, renditions 406a-406n may be generated for one segment of the ingested content 402, and renditions 408a-408n may be generated for another segment.

In traditional content delivery systems, the transcoding process may occur without the REE component. Such traditional systems may require substantial computational resources to determine less optimized convex hulls. Moreover, in VOD use cases, the video industry typically applies per-title convex hull optimization, dynamic optimizer (per-scene adaptation), dynamic packaging, and context-aware encoding techniques to define optimal ladders for the title or scene. These techniques are brute-force techniques because they involve many dozens of encodes for each segment at different resolutions and bitrates to find the convex hull. These techniques are not directly applicable to live use cases (e.g., live streaming), which are constrained by low-latency and real-time processing requirements.

In contrast, in implementations of the REE 410 in live streaming scenarios, the optimal bitrate for each of these renditions may be determined quickly and in real-time on the (live) ingested content 402, and the renditions may be generated according to the optimal bitrate as determined. In the described embodiments herein, the REE 410 is implemented into the example content delivery system 400 in a simple fashion with low computational requirements, fitting within the content delivery system while demanding minimal additional transcoding resources that are available in the system.

Figure 5:
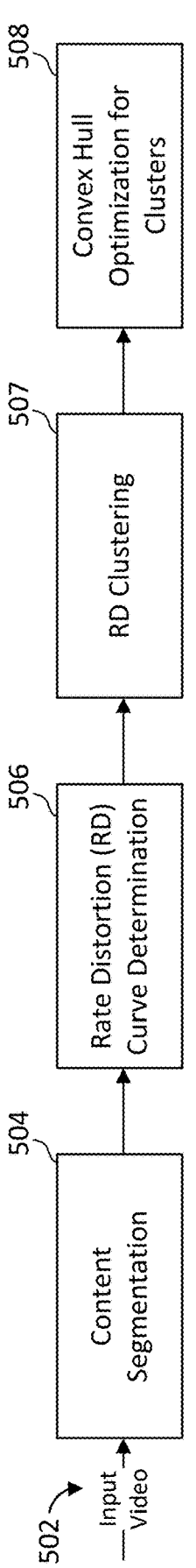
FIG. 5 is a block diagram illustrating an offline clustering process, according to some embodiments.

FIG. 5 is a block diagram showing an offline clustering process 500, according to some embodiments. In some embodiments, input video content 502 may be received by a content delivery system (e.g., at one or more processors). The input video content 502 may be divided or partitioned into multiple content segments 504 or chunks via segmentation. In some cases, segmentation may be performed based on time; e.g., video may be divided into equal segments each lasting a certain period of time (e.g., 2 seconds). In some cases, segmentation may be performed based on size; e.g., video may be divided into segments each having an equal file size. In some cases, segmentation may be performed based on characteristics of the video, such as motion, color, or other visual features.

In some embodiments, one or more RD curves may be determined for each segment. RD curve determination 506 may be based on features extracted from the segment, e.g., as described with respect to FIGS. 2 and 3A. The RD domain captures the qualities of video expected for a large bitrate region of interest (e.g., a range of 0 to 10000 kbps) for a particular resolution or complexity of content. RD curves 302-310 may be examples of the RD curve(s) determined.

In some embodiments, clustering may be performed on the determined RD curves to obtain RD clusters 507. In some approaches, a clustering method may be designed based on the operating region and slope of the rate distortion on an RD curve. That is, similar distortion metrics or other metrics (e.g., slope on an RD curve) for a given bitrate or bitrate region along an RD curve may be clustered together. Features of the content (e.g., QP, motion vectors, original bitrate, or original resolution) may also be considered when determining RD clusters 507. Further, for each of the clusters, convex hull optimization 508 may be performed in which a bitrate ladder may be optimized using a convex hull methodology, e.g., as described above with respect to convex hull labeling 205, where a convex hull may be determined based on the RD curves.

Figure 6:
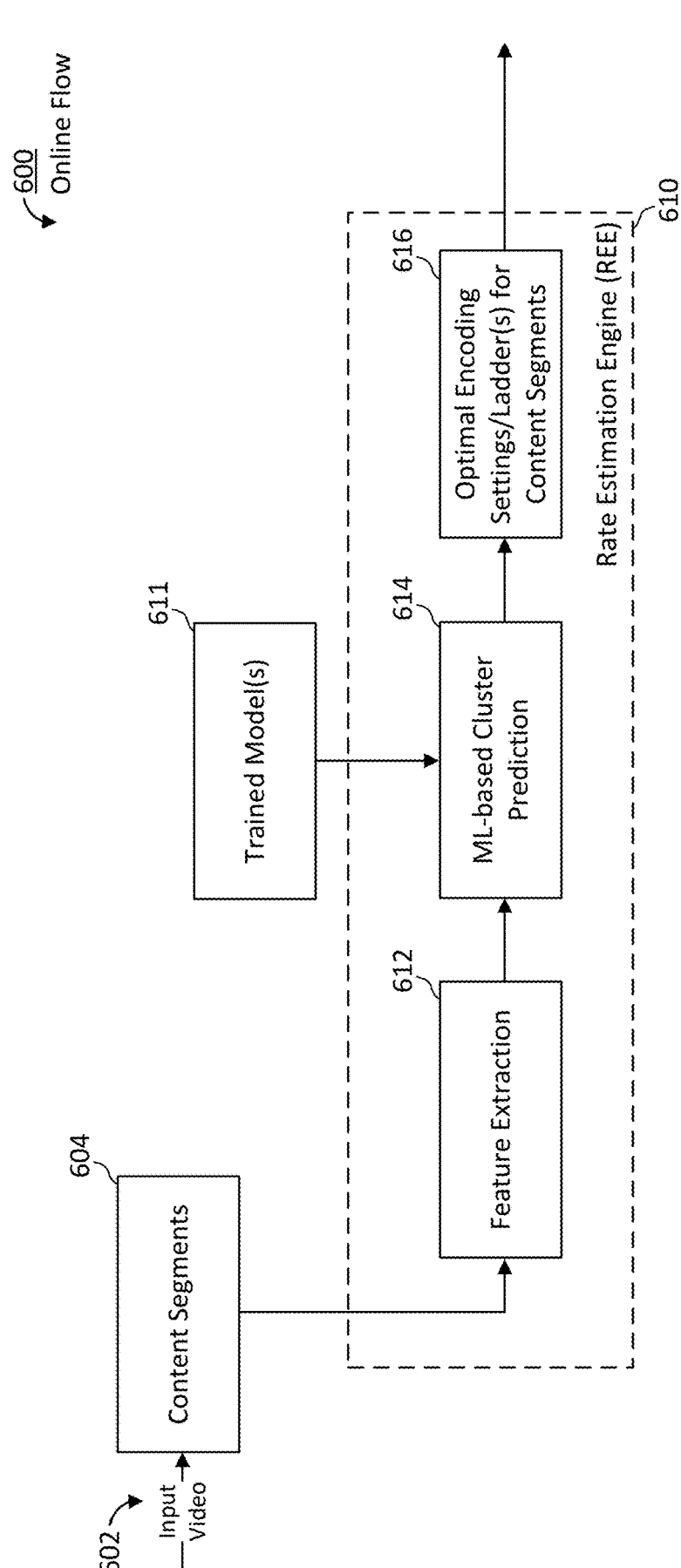
FIG. 6 is a block diagram illustrating an online bitrate optimization process, according to some embodiments.

FIG. 6 is a block diagram illustrating an online bitrate optimization process 600, according to some embodiments. In some embodiments, input video content 602 may be received by a content delivery system (e.g., at one or more processors), and divided or partitioned into multiple content segments 604 or chunks via segmentation, similar to segmentation 504.

In some embodiments, feature extraction 612 may be performed on the input video content 602. In some cases, feature extraction 612 may be an example of feature extraction 204. In some cases, feature extraction 612 may result in a subset of the features extracted in feature extraction 204. For example, 20 features may be extracted and used during offline training (e.g., in feature extraction 204), while only 4 features may be extracted in the online flow (e.g., in feature extraction 612). ML-based prediction 614 may be performed using a trained model 611 that has been previously trained according to a training process. The trained model 211 generated via training procedure 210 as described above may be an example of the trained model 611.

In some embodiments, ML-based prediction 614 may be performed using the extracted features to predict RD clusters. Predicted clusters may be compared with RD clusters 507 to determine an error or a difference. In some embodiments, ML-based prediction 614 may be performed using the extracted features to predict optimal bitrates. Predicted optimal bitrates may be compared with the convex hull for the RD clusters 507 as determined by convex hull optimization 508 to determine an error or a difference. Any determined errors may be later used as a data point for further optimizing the trained model 611.

Notably, the trained model 611 has already been generated offline over time using training data (e.g., features extracted from set of content 202), as this involves a large amount of computational resources and time. Advantageously, once the trained model 611 has been generated, usage (inference) of the trained model 611 on extracted features of ingested content (also a relatively speedy procedure) can output relatively immediate results. As noted above, the outputs and any errors can be used as further training data to optimize the trained model 611 in ongoing refinement of the trained model 611; a new, updated model can be generated and implemented at any time in place of the incumbent model.

Further, an optimal encoding settings and/or ladder(s) 616 for content segments may be generated based on, e.g., predicted RD clusters (and convex hull optimization 508 for the RD clusters) and/or predicted optimal bitrates. The optimal encoding settings and/or ladder(s) 616 may contain a set of configurations indicating, e.g., optimal bitrates for each cluster. Further examples of the encoding settings may include codecs, bitrates, resolutions for each of one or more renditions of a particular content asset. In some implementations, encoding settings may include encoding parameters such as QP or group of pictures (GOP) size (enabling dynamic GOP). Hence, the techniques described herein may enable generation of optimal encoding settings, ladders, and/or parameters to be applied to content segments in real-time. The feature extraction 612, ML-based prediction 614, and determination of the optimal encoding settings and/or ladder(s) 616 may be performed by the REE 610 as input video content 602 is ingested and segmented. The optimal encoding settings and/or ladder(s) 616 generated by the REE 610 may then be passed to a transcoder (e.g., transcoding module 112).

Thus, in the online flow, a resource-light processes at the REE 610 may provide information to form a mapping for clusters of live video content using a trained model 611 (e.g., using machine learning).

Figure 7:
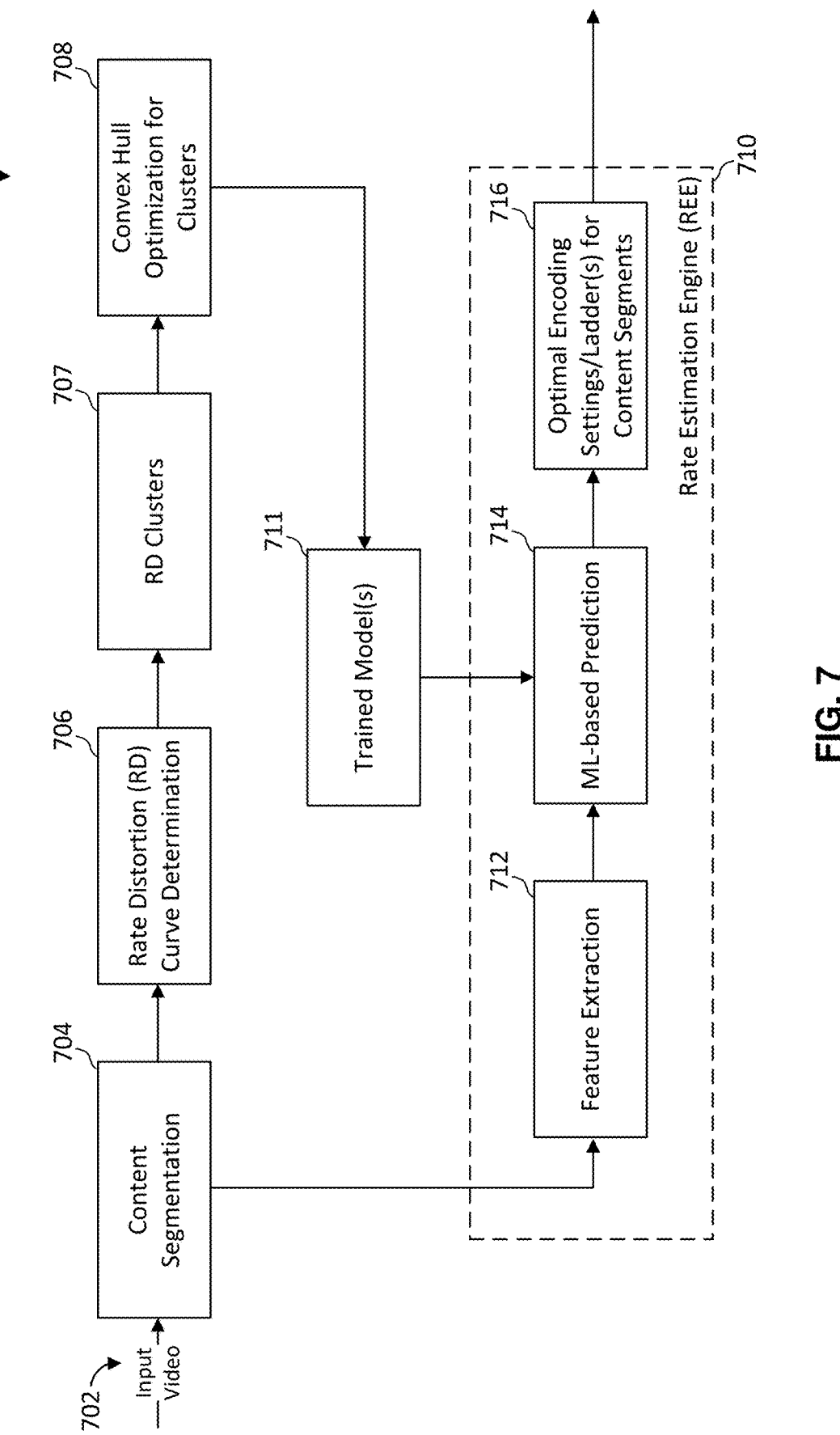
FIG. 7 is a block diagram of the online bitrate optimization process in conjunction with the offline clustering process, according to some embodiments.

FIG. 7 is a block diagram 700 of the online bitrate optimization process 600 in conjunction with the offline clustering process 500, according to some embodiments. Similar to in processes 500 and 600, input video content 702 may be received by a content delivery system (e.g., at one or more processors), and may have been divided or partitioned into multiple content segments 704 or chunks via segmentation. RD clusters 707 may have been obtained based on RD curve determination 706, and convex hull optimization 708 may be performed, similar to 504-508.

In some embodiments, feature extraction 712 may be performed on the input video content 702. In some embodiments, ML-based prediction 714 may be performed using one or more trained model(s) 711 (which may have been generated offline according to a training process, e.g., as part of offline process 500) to predict optimal encoding settings and/or ladder(s) 716 for content segments, e.g., bitrates. In some situations, such predicted outputs may be later used as a data point for further optimizing the trained model(s) 711. Further, an optimal encoding settings and/or ladder(s) 716 for content segments may be generated, containing optimal bitrates for each cluster. The optimal encoding settings and/or ladder(s) 716 generated by the REE 710 may then be passed to a transcoder (e.g., transcoding module 112). The online flow is primarily performed by the REE 710, which may include the feature extraction 712, ML-based prediction 714, and determination of the optimal encoding settings and/or ladder(s) 716, which are resource-light processes. The lightweight and trained aspects of the REE 710 are advantageous for optimizing bitrate for the received input video content 702 adaptively and in real-time, including when the input video content 702 comprises live content such as a live stream video.

It can be seen that, in this configuration, the offline flow and the online flow interact within the content distribution system in such a way that the REE 710 can be advantageously implemented into the content delivery system in a simple fashion without significantly affecting the existing infrastructure in the offline flow.

Figure 8:
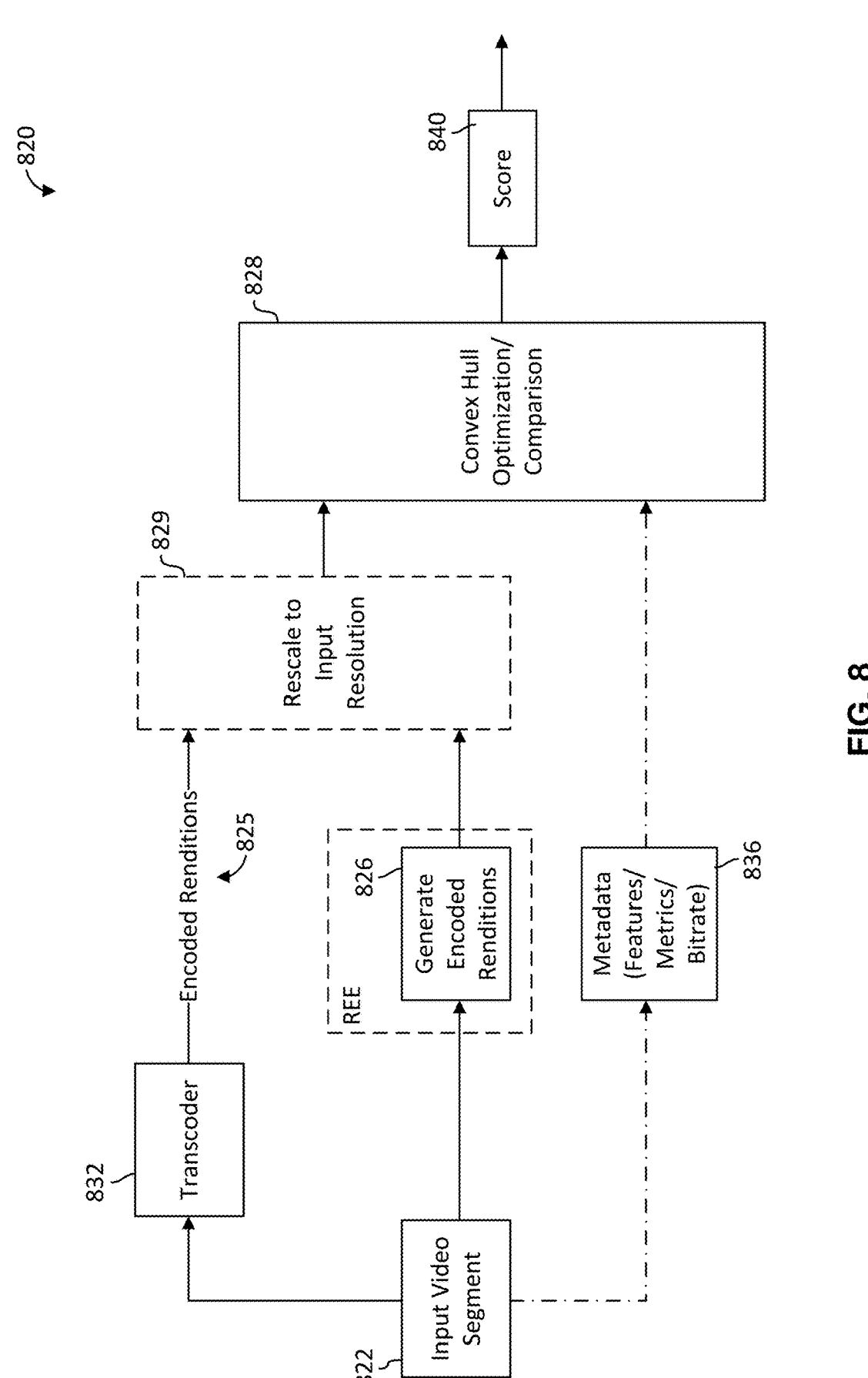
FIG. 8 is a block diagram illustrating an example approach for evaluating input content to determine a score indicative of quality of the content, according to some embodiments.

As an aside, referring back to the discussion of distortion metrics with respect to FIGS. 3A and 3B and the quality score, FIG. 8 shows a block diagram illustrating an example approach 820 for evaluating input content (e.g., from set of content 202) to determine a score indicative of quality of the content, according to some embodiments. In some cases, example approach 820 may be an example of the convex hull optimization 708. In some embodiments, an input video segment 822 may be received. The input video segment 822 may be part (e.g., a segment) of a live stream video, sent to a transcoder 832. One or more first renditions 825 and/or corresponding bitrates may be generated by the transcoder 832. One or more second renditions 826 and/or corresponding bitrates may be generated using a REE (and a trained model), as detailed with respect to FIG. 4 above.

In some embodiments, convex hull optimization 828 may be performed on the one or more first renditions 825 and the one or more second renditions 826, e.g., according to the offline flow 500 described above. In some implementations, the one or more first renditions 825 may "brute force" various combinations of renditions and bitrates given a set of content or catalogue, e.g., including all possible combinations. In some implementations, the one or more first renditions 825 and the one or more second renditions 826 may be rescaled to the original input resolution. In some implementations, metadata 836 (e.g., features, metrics, and/or original bitrate) may be obtained from the input video segment 822 during a live deployment of content; e.g., the features, original bitrate, and/or metrics may be extracted or otherwise determined during a live stream of content having the input video segment 822. In some cases, the features, original bitrate, and/or metrics may be obtained from a component of a content delivery system based on a previous extraction (e.g., an external log generated during an offline process). In some approaches, the metadata 836 may be used to determine clusters for performing the convex hull optimization 828, e.g., as illustrated in FIG. 7.

Given the above, a score 840 comprising an objective score and/or subject score may be determined. For example, an objective score may be determined using Eqn. 1, where VMAF metrics from metadata 836 are used. In some approaches, the one or more first renditions 825 and one or more second renditions 826 may be compared to one another. For example, differences between (i) all possible combinations of first renditions 825 and corresponding bitrates and (ii) second renditions 826 and corresponding bitrates may be identified. This difference may be used as additional data to further train the model used by the REE. In some cases, the metadata 836 may be used in the comparison. For example, how close a feature (e.g., QP) of a rendition is to that of the input video segment 822 may be indicative of the quality of the rendition. In some approaches, a subjective score may also be determined. For example, viewers may be presented with the one or more first renditions 825 or the one or more second renditions 826, and a subjective quality assessment may be obtained. This data may be correlated to optimal bitrates, which may be used in training of a model to obtain a trained model such as trained model 211.

Superclusters and Subclusters

A ML model may map a set of extracted features from input content (e.g., video) to clusters that have information about the amount of bitrate modulation. The clusters may be configured to have a monotonic ordered relationship among clusters. For instance, if clusters are derived or grouped based on video features (e.g., QP), cluster N might represent bitrate modulation of 0-10%, while cluster N+1 might represent those at 10-20%, and so on. Such ordered relationships of clusters may be useful for organization and trend preservation. However, too many granular clusters can affect prediction accuracy of the model.

To mitigate this issue, certain clusters may be combined into what is referred to herein as "superclusters." Superclusters may be determined and grouped in a manner that preserves the abovementioned monotonic relationships among clusters while enhancing or preserving prediction capabilities and accuracy. Superclusters may represent bitrate-saving categories of clusters. As an illustrative example, if three superclusters C0, C1, and C2 are formed, with bitrate savings of 40%, 15%, and 0% respectively, they may serve as references for determining bitrate rather than the individual clusters.

In some embodiments, a ground-truth mapping of content features with ideal clusters may be generated using a convex hull optimization technique. See, for example, FIG. 7 and associated descriptions. Then, a dynamic threshold may be set for prediction accuracy of the model. When a cluster's prediction accuracy dips below this threshold, the cluster may become a candidate for merging into a supercluster. Otherwise, the cluster may remain as is without being merged into a supercluster. In addition, in some implementations, weights may be assigned to clusters according to (e.g., weighted by) their prediction accuracy or significance. In some approaches, the significance of clusters may be determined in a similar way as determining the top features based on significance as discussed above. The clusters may be merged to respective superclusters considering these weights indicative of prediction accuracy or significance, ensuring that crucial data patterns are not lost in the process.

Figure 9:
FIG. 9 shows graphs illustrating example of different combinations of clusters into superclusters, according to some embodiments.

FIG. 9 shows graphs 910, 920, 930 illustrating examples of different combinations of clusters into superclusters, according to some embodiments. Graphs 910, 920, 930 may correspond to different resolutions. Each cluster is represented by a histogram bar showing the quantity of RD curves in the cluster. In graph 910 for a first resolution (e.g., 720p), the first two clusters may be grouped into a supercluster 912, while other clusters 914, 916 remain as is. In graph 920 for a second resolution (e.g., 480p), the first two clusters may be grouped into a supercluster 922, the next two clusters may be grouped into another supercluster 924, and the fifth cluster 926 may be left as is. In graph 930 for a third resolution (e.g., 360p), the first two clusters may be grouped into a supercluster 932, the next two clusters may be grouped into another supercluster 934, and the fifth cluster 936 may be left as is.

A specific example approach for merging clusters into superclusters follows. First, a prediction accuracy threshold for a cluster of interest may be selected. A condition for merging then would be $A_i < T$, where $A_i$ represents the prediction accuracy of cluster i, and T represents the dynamic threshold for prediction accuracy. Further, a weight of a cluster i may be defined as $$W_i = A_i / \sum\nolimits_{j=1}^{n} A_j,$$

where n is the total number of clusters.

In some embodiments, the prediction accuracy threshold T may be adaptive to a feature of the content. In some implementations, T may be based on resolution. For instance, relatively higher resolutions such as 720p and above inherently carry more information and detail, potentially demanding a higher accuracy and/or a higher threshold for accuracy. In contrast, lower resolutions (such as 360p) inherently contain less detail, and thus may be more forgiving in terms of accuracy requirements, warranting a lower accuracy threshold. In some implementations, T may be based on motion or frame rate. For instance, a high-motion action scene in 720p with 60 frames per second (FPS) may need a different threshold compared to 480p content having 30 FPS, caused by varying levels of perceptual details. In other implementations, determination of the threshold can be finer based on content complexity, bitrate efficiency, user feedback metrics, etc.

In some implementations, historical information may be used to determine which clusters to merge. For example, past accuracy metrics estimated by the model may be used, e.g., in addition to or alternatively to $A_i$. That is, a temporally modified version of $A_i$ may represent not just the current prediction accuracy of a cluster i but also one or more past accuracy metrics associated with cluster i. In some cases, the current and/or past accuracy metrics may be averaged or weighted, e.g., more weight given to more recent data, or a moving average or a sliding window of the most recent data points.

Next, a set of candidate clusters C for merging may be determined, where $C = \{c_1, c_2, \ldots c_n\}$. The set of candidate clusters may be merged into a supercluster SC considering the weights, where $$SC = \sum\nolimits_{i=1}^{n} W_i * c_i.$$

That is, the optimal bitrate represented by the supercluster can be a weighted sum of optimal bitrates corresponding to the clusters being merged into the supercluster.

While superclusters may provide bitrate savings through combining certain clusters, forming superclusters may result in sharp transitions in bitrate. Rapid bitrate fluctuations can lead to inconsistent visual quality, which may degrade the viewing experience or cause viewer discomfort or frustration.

To ensure a smoother transition between bitrate savings, at least one additional cluster referred to herein as a "subcluster" may be inserted between superclusters. Subclusters are configured to provide a gradual transition in bitrate, rather than sudden jumps. A clustering framework configured for N superclusters and associated M subclusters can thereby dynamically tweak the streaming bitrate to optimize the viewing experience.

Referring back to the above examples of superclusters C0 (40% saving), C1 (15% saving), and C2 (0% saving), five subclusters can be added between C0 and C1, so that the bitrate decreases by approximately 5% sequentially instead of a direct jump from 40% to 15%. Similarly, for example, between C1 and C2, instead of a direct jump from 15% to 0%, three subclusters can be added, decreasing the bitrate by approximately 5% sequentially.

Moreover, different resolutions, for example, 720p, 480p, and 360p, have distinct visual characteristics. A fluctuation in bitrate may be far more noticeable in a higher resolution such as 720p compared to 360p because of the different levels of detail and clarity. Consequently, in some embodiments, the number and calibration of subclusters added between superclusters may vary based on resolution to maintain the visual integrity.

Figure 10:
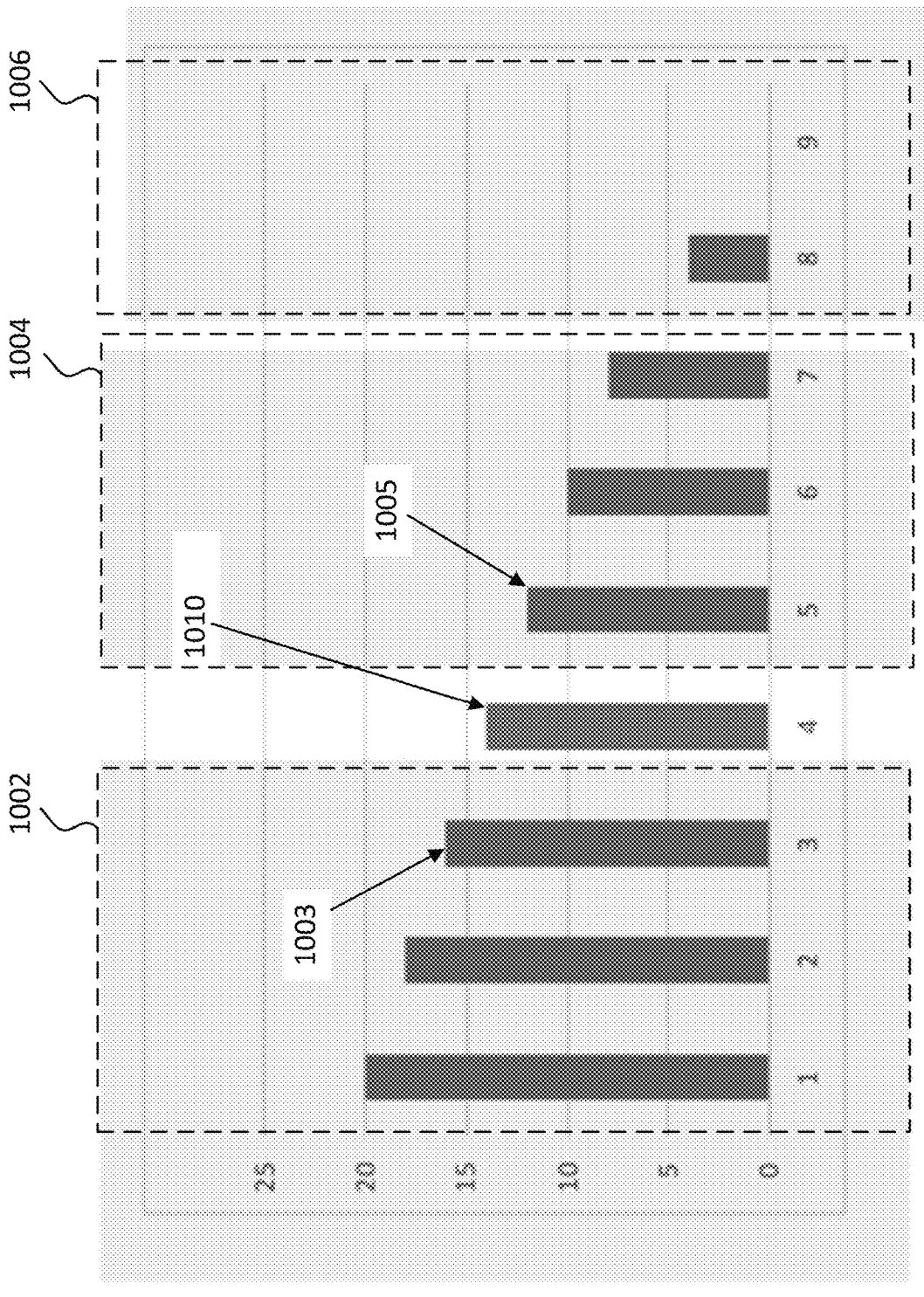
FIG. 10 is a graph showing an example of an insertion of a subcluster between superclusters, according to some embodiments.

FIG. 10 is a graph 1000 showing an example of an insertion of a subcluster 1010, according to some embodiments. As can be seen, three superclusters 1002, 1004, 1006 have been formed. The jump in bitrate between superclusters 1002 and 1004 may be relatively sharp and beyond an acceptable amount, e.g., above a threshold amount (e.g., above a 5% difference). More specifically, there is a jump in bitrate between cluster 1003 of supercluster 1002 and cluster 1005 of supercluster 1004. The subcluster 1010 inserted between the superclusters 1002 and 1004 may have an intermediate level of bitrate between that of the cluster 1003 and the cluster 1005, such that the amount of jump in bitrate is less than the threshold amount. In some scenarios, multiple subclusters beyond subcluster 1010 may be added between the superclusters 1002 and 1004 to ensure that each of the changes in bitrate is smoothened and within an acceptable amount. In graph 1000, it may not be the case that the change in bitrate between superclusters 1004 and 1006 is above the threshold. Hence, no subcluster may be added between them. However, as network conditions, resolution, features, etc. change and are detected, e.g., by the REE (e.g., during feature extraction or ML-based prediction of clusters), these conditions changes may require insertion of subclusters. On the other hand, subclusters may be removed depending on such condition changes. For example, L number of subclusters may added to or removed from M subclusters between given superclusters (which may remain N or have changed). Usage of subclusters can thus provide a responsive adaptation to varying content and network conditions to provide a smoother viewing experience.

In further embodiments, historical information (e.g., past data) regarding cluster predictions may be used in the subcluster estimation. In some implementations, ML-based predictions of superclusters, and historical data associated with superclusters and/or subclusters, may be leveraged to seamlessly increment or decrement by L subclusters, ensuring a smooth transition between different bitrate levels and enabling the responsive adaptation to varying content and network conditions. For example, consider three scenarios of superclusters 0, 1, and 2. For a predicted supercluster 0, the subcluster may reduce by one level (limited to a minimum of 0), indicating a strong inclination for maximum bitrate savings. For a predicted supercluster 1, if the current prediction surpasses the past prediction for a given resolution, the subcluster may increase by one, up to some maximum allowable limit. Otherwise, the subcluster may decrease by one, with a floor of 1, ensuring bitrate adjustments within the confines of supercluster 1. For a predicted supercluster 2, the subcluster may escalate by one level, capped at the maximum subcluster limit, indicating minimal or no bitrate savings. This logic ensures a dynamic adjustment of the bitrate in response to varying conditions, such as content complexity and network fluctuations. There are several effects of modulating the number of subclusters based on predictions and past history: Adaptability is achieved, as the content delivery system (e.g., by the REE during ML-based predictions) can respond in real-time to changing scenarios. Smoothness in the viewing experience is maintained by preventing abrupt changes in quality, ensuring viewer satisfaction. Optimality is preserved, as the model may make use of both predictive insights and past trends, balancing between proactive and reactive strategies.

In some embodiments, latency-aware improvements to changes in bitrate can be made by leveraging the granularity of bitrate transitions or steps. Specifically, a group of pictures (GOP) may be evaluated to determine what an appropriate bitrate change will be. For example, consider a GOP of 30, 60, 120, or more. In some cases, an appropriate bitrate change may be determined after evaluating only 15 frames from that GOP. This allows time for the bitrate to start being adjusted as soon as the next GOP starts. There is a tradeoff between complexity, latency, and accuracy based on how frames are used for feature extraction. It has been empirically determined that 15 frames can provide a desirable tradeoff between complexity, latency, and accuracy. In some cases, the extracted features may be extracted from a predetermined subset of frames (e.g., the first 15 frames) from each content segment. However, the number of frames may be tuned differently for different conditions or content delivery systems. In some instances, the full adjustment of the bitrate may not be made to avoid drastic changes in bitrate, but the bitrate may begin adjusting as soon as the next GOP begins, starting at the next frame (e.g., I-frame). In effect, the bitrate can be adjusted at the latency of one frame interval. A good frame interval may be 2 seconds, resulting in a two-second latency on bitrate changes. This can result in a smooth viewer experience, optimal resource utilization, and quick and precise adjustments with reduced buffering and lag.

In further implementations, the granularity of bitrate transitions may be dynamically adjusted as subclusters are determined. In some cases, an optimal bitrate multiplier may be determined for each subcluster estimation. A bitrate multiplier applied to clusters can dynamically adjust the granularity of bitrate transitions, e.g., during a live stream. In some implementations, a rate or size of adjustment to the bitrate may have a constraint. For example, the bitrate should not adjust more than some percentage (e.g., 4%) of the originally targeted bitrate per bitrate transition step. These can help maintain perceptual consistency, promote bandwidth efficiency, and reduce buffering and lag.

In some configurations, the granularity may be adjusted based on the content, e.g., the type of content or context, e.g., depending on whether the content includes gaming, talking heads, everyday "in real life" (IRL) activities shown in real-time, fast-action sports, slow-paced documentaries, etc. In some cases, granularity may be based on resolution (or other features) of the content. For example, granularity may be set based on the viewer's chosen or default resolution. Higher resolutions may be more susceptible to visible quality fluctuations, for instance, and may benefit from more granularity to reduce rapid fluctuations. As another example, device-aware granularity may involve adaptation of bitrate steps based on device capabilities. For instance, devices with higher resolution displays may benefit from different bitrate step granularity than devices with lower resolutions; e.g., greater granularity may reduce artifacts and improve perceived quality on higher-resolution devices. As another example, instead of fixed bitrate steps, bitrate steps may be scaled dynamically, e.g., based on network health. For instance, during peak traffic hours, a finer granularity may be used to ensure smooth content streaming. The adjustment constraint may also be modulated based on different factors. For example, content-adaptive granularity is based on content features such as motion, or residual information or features. For instance, scenes with high action could be allocated smaller adjustments to bitrate steps for smoother transitions.

Figure 11:
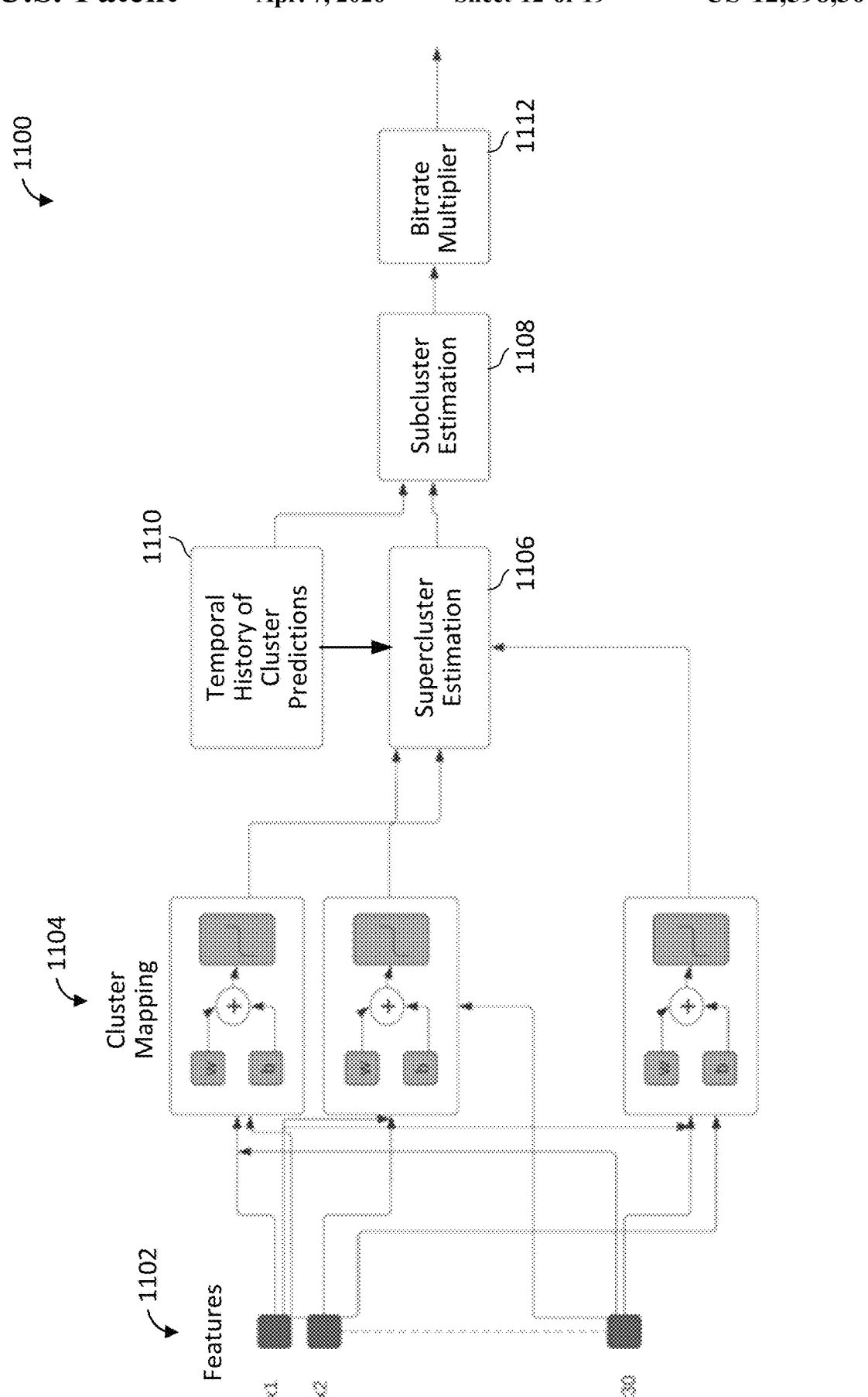
FIG. 11 is a block diagram illustrating supercluster and subcluster estimations, according to some embodiments.

FIG. 11 is a block diagram 1100 illustrating supercluster and subcluster estimations, according to some embodiments described above. As noted above, content features 1102 may be mapped to ideal clusters a convex hull optimization technique 1104. See, for example, FIG. 7 and associated descriptions. Estimation of superclusters 1106 may be based at least on, e.g., prediction accuracy of clusters with respect to a threshold, where one or more superclusters may be formed with candidate clusters that meet the $A_i<T$ condition. In some implementations, one or more subclusters 1108 may be determined and added to the one or more superclusters. In some configurations, historical information 1110 may be used to determine which clusters to merge into superclusters 1106 and/or to determine the subclusters 1108, as described above. Further, in some approaches, a bitrate multiplier 1112 may be determined and applied to subclusters, e.g., to adjust the adjust the granularity of bitrate transitions, as described above.

Methods

Figure 16:
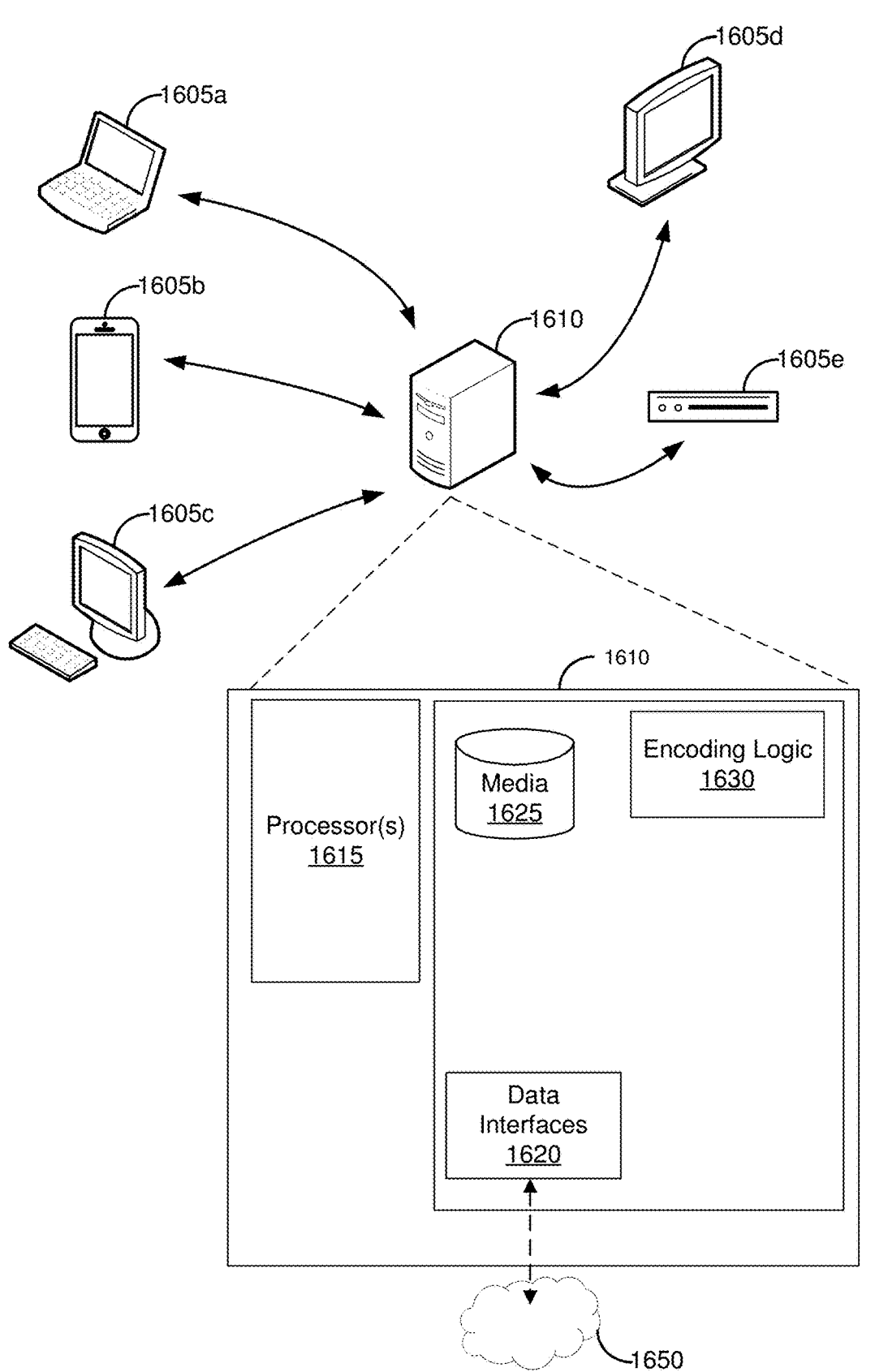
FIG. 16 is a block diagram of an example computing environment in which video data may be encoded into frame regions as enabled by the present disclosure.

FIG. 12 illustrates a method 1200 of adaptive bitrate optimization for content delivery, according to some embodiments. Structure for performing the functionality illustrated in one or more of the blocks shown in FIG. 12 may include hardware (e.g., one or more processors) and/or software components of a computerized apparatus or system such as a content delivery system of the type described herein, or a computer-readable apparatus including a storage medium storing computer-readable and/or computer-executable instructions configured to, when executed by one or more processors, cause the one or more processors or the apparatus or the system to perform operations represented by blocks below. An example of the computerized system is illustrated in FIG. 16, described in more detail below. It should also be noted that the operations of the method 1200 may be performed in any suitable order, not necessarily the order depicted in FIG. 12. Further, the method 1200 may include additional or fewer operations than those depicted in FIG. 12.

At block 1210, the method 1200 may include extracting, in real-time, features from content segments of a video stream. In some configurations, the video stream may be a live video stream. In some approaches, content segments may be derived by dividing the live video stream into segments or chunks based on length (e.g., 2 seconds per segment). Other examples of segmentation may be based on size or characteristic. In some embodiments, the features may be associated with the content segments and include parameters such as QPs, original bitrates, original resolutions, motion vectors, and/or coded block pattern information, among others. In some embodiments, the features may include a category of the live video stream.

At block 1220, the method 1200 may include, for each content segment of the video stream, identifying a rate-distortion (RD) cluster based on a mapping of the extracted features to RD clusters using one or more trained machine learning models (e.g., trained model 211 generated via a training procedure 210). In some embodiments, the mapping of the extracted features to the RD clusters may be generated offline. In some implementations, such a mapping may be based on a ML-trained model (e.g., trained model 211).

In some embodiments, extracting the features may include statistically fitting at least portions of the features, and determining a combination of the statistically fitted features having the highest impact on accuracy of prediction of the RD cluster; and the mapping of the extracted features to the RD clusters may include a mapping of the combination of the statistically fitted features having the highest impact to the RD clusters using the one or more trained machine learning models. For example, the top features may be identified and selected based on significance or importance to quality, training of a model, accuracy of prediction by the model, and/or optimal bitrate, resulting in "augmented" features. These augmented features (rather than the entire set of extracted features) may be used in the mapping of the features to the RD clusters. In some implementations, the statistical fitting may include polynomial fitting of features.

In some embodiments, the method 1200 may further include generating augmented features by statistically fitting the extracted features, and determining a set of augmented features having the highest impact on accuracy of prediction of the RD cluster, wherein the mapping of the extracted features to the RD clusters comprises a mapping of the set of augmented features to the RD clusters using the one or more trained machine learning models.

In some embodiments, the transcoding ladder may include resolution and codec information. In some embodiments, transcoding ladder may include configuration information relating one or more optimal combinations of bitrate, resolution, and codec.

At block 1230, the method 1200 may include transcoding the video stream by applying, to the content segments, a transcoding ladder corresponding to each identified RD cluster.

In some embodiments, the transcoding ladder corresponding to an identified RD cluster applied to a current content segment of the live video stream is applied to a subsequent content segment of the live video stream.

In some embodiments, the transcoding ladder corresponding to an identified RD cluster to a current content segment of the live video stream may be applied to a subsequent content segment of the live video stream within one frame interval to effect a change in bitrate in the subsequent content segment within the one frame interval. In some embodiments, the extracted features may be extracted from a predetermined subset of frames from each content segment.

In some embodiments, transcoding the live video stream includes limiting a bitrate change between sequential content segments for each rendition. For example, the bitrate should not adjust more than some percentage (e.g., 4%) of the originally targeted bitrate per bitrate transition step. Otherwise, in some approaches, the granularity of bitrate transitions may be dynamically adjusted as subclusters are determined.

Figure 13:
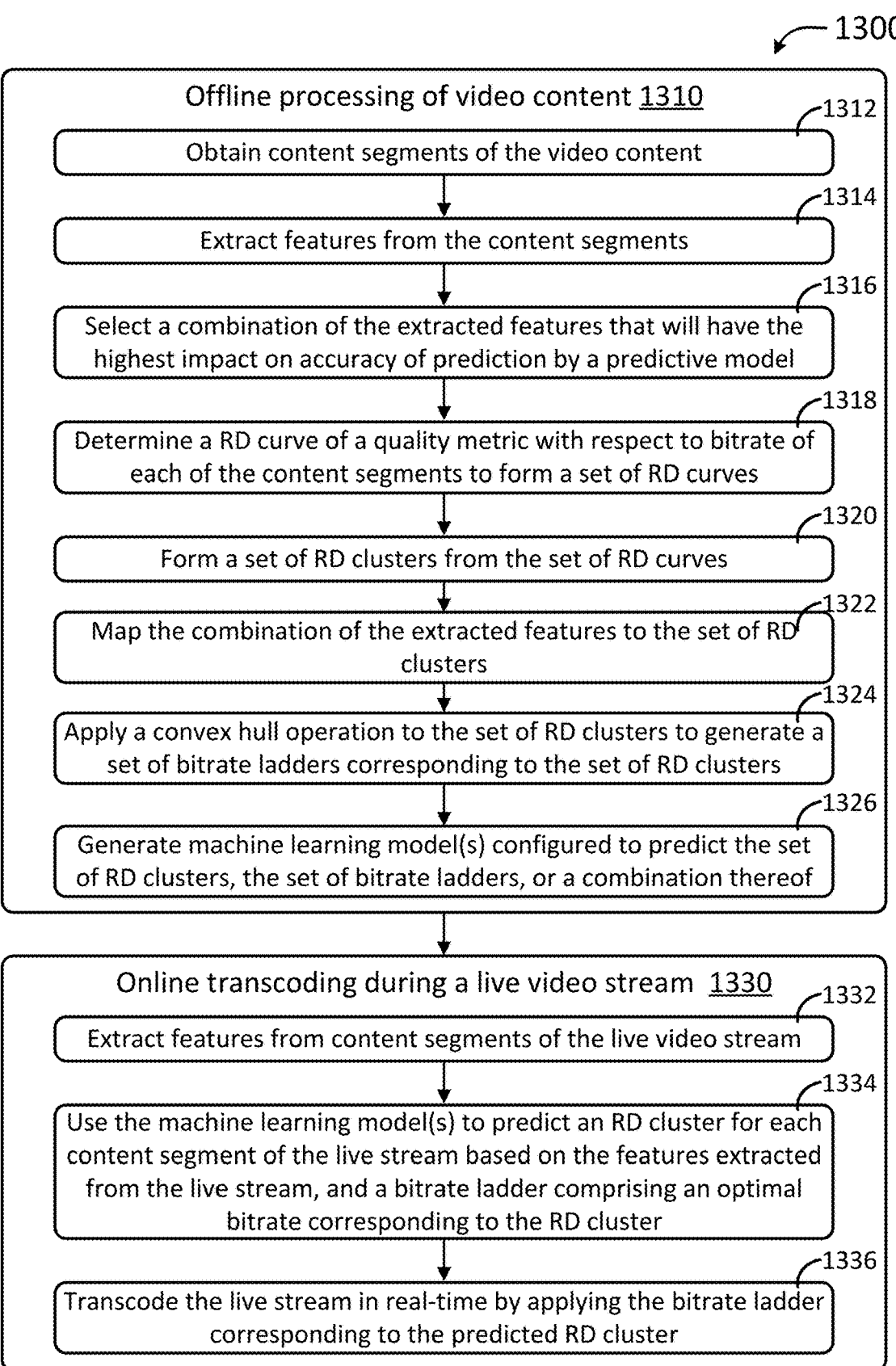
FIG. 13 illustrates another method of adaptive bitrate optimization for content delivery, according to some embodiments.

FIG. 13 illustrates another method 1300 of adaptive bitrate optimization for content delivery, according to some embodiments. Structure for performing the functionality illustrated in one or more of the blocks shown in FIG. 13 may include hardware (e.g., one or more processors) and/or software components of a computerized apparatus or system such as a content delivery system of the type described herein, or a computer-readable apparatus including a storage medium storing computer-readable and/or computer-executable instructions configured to, when executed by one or more processors, cause the one or more processors or the apparatus or the system to perform operations represented by blocks below. An example of the computerized system is illustrated in FIG. 16, described in more detail below. It should also be noted that the operations of the method 1300 may be performed in any suitable order, not necessarily the order depicted in FIG. 13. Further, the method 1300 may include additional or fewer operations than those depicted in FIG. 13.

In some embodiments, the method 1300 may broadly include performing offline processing on video content at block 1310 (including blocks 1312-1326), and performing online transcoding during a live video stream at block 1330 (including blocks 1332-1336). Blocks 1310-1326 may generally correspond to at least portions of the offline flow 500, and blocks 1330-1336 may generally correspond to at least portions of the online flow 600.

At block 1312, the method 1300 may include obtaining content segments of the video content. In some approaches, content segments may be derived by dividing the live video stream into segments or chunks based on length (e.g., 2 seconds per segment). Other examples of segmentation may be based on size or characteristic.

At block 1314, the method 1300 may include extracting features from the content segments. In some implementations, the features extracted from the content segments of the live video stream may include a video content category and one or more of a quantization parameter, an original bitrate, an original resolution, a motion vector, or coded block pattern information.

At block 1316, the method 1300 may include selecting a combination of the extracted features that will have the highest impact on accuracy of prediction by a predictive model. The selected combination of extracted features may be features made up of the top features, discussed elsewhere herein.

At block 1318, the method 1300 may include determining a rate-distortion (RD) curve of a quality metric with respect to bitrate of each of the content segments to form a set of RD curves. In some implementations, the quality metric may be based on PSNR, VMAF, or SSIM. In other implementations, another metric may be used as described above, for example, a percentile-based quality score.

At block 1320, the method 1300 may include forming a set of RD clusters from the set of RD curves. In some implementations, the RD clusters may be formed using supervised learning or unsupervised learning with a Bjontegaard delta (BD) rate cost function. In some implementations, the unsupervised learning may be K-means clustering. As an example of forming RD clusters with the BD rate cost function, a bitrate difference threshold may be set. If the BD rate of two curves is under the bitrate difference threshold (the bitrate is sufficiently similar), the two curves may be grouped into a cluster.

At block 1322, the method 1300 may include mapping the combination of the extracted features to the set of RD clusters.

At block 1324, the method 1300 may include applying a convex hull operation to the set of RD clusters to generate a set of bitrate ladders corresponding to the set of RD clusters At block 1326, the method 1300 may include generating one or more machine learning models configured to predict the set of RD clusters, the set of bitrate ladders, or a combination thereof. The generated ML model may be an example of the trained model 211.

At block 1332, the method 1300 may include extracting features from content segments of the live video stream. In some implementations, the features extracted from the content segments of the live video stream may include a video content category and one or more of a quantization parameter, an original bitrate, an original resolution, a motion vector, or coded block pattern information.

At block 1334, the method 1300 may include using the one or more machine learning models to predict an RD cluster for each content segment of the live stream based on the features extracted from the live stream, and a bitrate ladder comprising an optimal bitrate corresponding to the RD cluster. This ML may be one generated in the offline flow above.

At block 1336, the method 1300 may include transcoding the live stream in real-time by applying the bitrate ladder corresponding to the identified RD cluster.

FIG. 14 illustrates a method 1400 for adaptive optimization of clusters for bitrate prediction, according to some embodiments. Structure for performing the functionality illustrated in one or more of the blocks shown in FIG. 14 may include hardware (e.g., one or more processors) and/or software components of a computerized apparatus or system such as a content delivery system of the type described herein, or a computer-readable apparatus including a storage medium storing computer-readable and/or computer-executable instructions configured to, when executed by one or more processors, cause the one or more processors or the apparatus or the system to perform operations represented by blocks below. An example of the computerized system is illustrated in FIG. 16, described in more detail below. It should also be noted that the operations of the method 1400 may be performed in any suitable order, not necessarily the order depicted in FIG. 14. Further, the method 1400 may include additional or fewer operations than those depicted in FIG. 14.

At block 1410, the method 1400 may include extracting, in real-time, features from content segments of a video stream. In some configurations, the video stream may be a live video stream. In some embodiments, the features may include one or more of a video content category, a quantization parameter, an original bitrate, an original resolution, a motion vector, or coded block pattern information. In some implementations, the features may be extracted from a subset of frames at a start of the content segments.

At block 1420, the method 1400 may include identifying superclusters representing optimal transcoding parameters for the content segments of the live video stream based on a mapping of the features to superclusters generated by one or more trained machine learning models, the identified superclusters configured to maintain a quality level associated with the content segments. In some embodiments, the transcoding parameters may include bitrates. In this way, the quality of the video may not be degraded and quality loss may be reduced or minimized while the transcoding parameters (e.g., bitrates) are optimized. In some embodiments, the method 1400 may further include forming the superclusters by merging candidate clusters having prediction accuracies below an accuracy threshold. In some implementations, the accuracy threshold may be determined based on video resolution, frame rate, motion, or a combination thereof, associated with the content segments. In some implementations, the accuracy threshold may be determined based on content complexity, bitrate efficiency, a user-provided metric, or a combination thereof.

In some embodiments, each of the optimal bitrates represented by the superclusters may be based on a weighted sum of optimal bitrates of candidate clusters being merged into a respective supercluster.

In some embodiments, the candidate clusters being merged may be identified based on historical information associated with the candidate clusters.

At block 1430, the method 1400 may include assigning a subcluster between the identified superclusters. In some embodiments, the subcluster may be inserted between adjacent ones of the identified superclusters to reduce the fluctuation of the bitrates associated with the superclusters, reduce buffering associated with the content segments, reduce a time to play the video stream (e.g., time to video (TTV)), or a combination thereof. In some cases, a number of subclusters inserted between the adjacent ones of the identified superclusters may be determined based on a video resolution. In some cases, the number of subclusters inserted may be determined based on a difference between the bitrates associated with the superclusters as compared to a threshold. In some cases, it may be determined based on both.

In some embodiments, the subcluster may be identified based on historical information associated with cluster predictions made by the trained machine learning model.

At block 1440, the method 1400 may include applying bitrates associated with the superclusters and the subcluster to the video stream.

FIG. 15 illustrates another method 1500 for adaptive optimization of clusters for bitrate prediction, according to some embodiments. Structure for performing the functionality illustrated in one or more of the blocks shown in FIG. 15 may include hardware (e.g., one or more processors) and/or software components of a computerized apparatus or system such as a content delivery system of the type described herein, or a computer-readable apparatus including a storage medium storing computer-readable and/or computer-executable instructions configured to, when executed by one or more processors, cause the one or more processors or the apparatus or the system to perform operations represented by blocks below. An example of the computerized system is illustrated in FIG. 16, described in more detail below. It should also be noted that the operations of the method 1500 may be performed in any suitable order, not necessarily the order depicted in FIG. 15. Further, the method 1500 may include additional or fewer operations than those depicted in FIG. 15.

At block 1502, the method 1500 may include training a machine learning model to obtain a mapping of features associated with video content to the clusters representing optimal bitrates.

At block 1504, the method 1500 may include applying the mapping to the video content to determine a prediction accuracy of each cluster.

At block 1506, the method 1500 may include comparing the prediction accuracy of each cluster to an accuracy threshold. In some embodiments, the accuracy threshold may vary with resolution, frame rate, or motion, or a combination thereof, associated with the content segments.

At block 1508, the method 1500 may include forming superclusters by merging clusters having the prediction accuracy below the accuracy threshold with other clusters. In some embodiments, clusters being merged into a supercluster may each be assigned a weight based on the prediction accuracy of the cluster, and an optimal bitrate represented by the supercluster may be a weighted sum of optimal bitrates corresponding to the clusters being merged into the supercluster.

At block 1510, the method 1500 may include extracting the features from content segments of a live video stream.

At block 1512, the method 1500 may include identifying a set of superclusters for the content segments of the live video stream based on the extracted features, the set of superclusters associated with respective optimal bitrates for the content segments.

At block 1514, the method 1500 may include assigning a subcluster between the identified set of superclusters, the subcluster configured to reduce bitrate fluctuation of the respective optimal bitrates associated with the set of superclusters. In some embodiments, a number of subclusters between superclusters may vary with resolution of the content segments of the live video stream, a difference between respective bitrates associated with the set of superclusters as compared to a threshold, or a combination thereof.

At block 1516, the method 1500 may include applying the respective optimal bitrates associated with the set of superclusters and a bitrate associated with the subcluster to the live video stream.

Apparatus

FIG. 16 illustrates an example of a computing environment in which video data may be encoded into frame regions as enabled by the present disclosure. The computing environment of FIG. 16 includes a networked apparatus (e.g., server 1610) which can be used to perform encoding on obtained video data, and provide encoded video data to computerized devices 1605*a-e* (e.g., user devices, display devices).

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media presentations herein is merely by way of example. Suitable alternatives known to those of skill in the art may be employed.

Server 1610 may be part of a content delivery system that conforms to any of a wide variety of architectures. The functionality and components of media server 1610 can use one or more servers and be deployed at one or more geographic locations (e.g., across different countries, states, cities, etc.) using a network 1650 such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Server 1610 can include one or more data interfaces 1620 configured to perform data communication with the network 1650, e.g., to receive video data from a video source, transmit live content (e.g., livestream content), or transmit encoded video data. Server 1610 can include various types of logic used to provide media presentations for playback at devices 1605*a-e*. In FIG. 16, server 1610 includes storage 1625 and can include one or more processors 1615, memory, and other hardware for performing the tasks and logic disclosed herein. The storage 1625 may store computer-readable and computer-executable instructions configured to, when executed by the one or more processors 1615, cause the server 1610 to perform operations as described herein (e.g., methodologies of FIGS. 12-15). Storage 1625 may also store a variety of media content (e.g., VOD content) for playback on devices 1605*a-e*, such as episodes of television shows, movies, music, etc. Storage 1625 can be a storage mechanism, such as a database. Server 1610 also includes encoding logic 1630. In some embodiments, the encoding logic 1630 may be configured to perform operations as described above. Spatially lapped encoding, parallel image processing, and methodologies 1200, 1300, 1400 and 1500 are examples of operations that may involve or be performed or caused by the encoding logic 1630.

Figure 17:
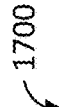
FIG. 17 is a block diagram illustrating an example video transmission system that may be used in accordance with the present disclosure.

FIG. 17 is a diagram illustrating an example low-latency video transmission system that may be used in accordance with the present disclosure. As shown in FIG. 17, video content may be captured at a data capture node 1710 and transmitted to a video streaming service 1720, which, in turn, may transmit the video content to one or more recipients such as players 1750A-C. In some examples, video content may also be transmitted to player/Content delivery Network (CDN) 1751. In some examples, players 1750A-C may be players that are affiliated with (e.g., that are developed and/or distributed by) the video streaming service 1720, while player/CDN 1751 may be a third-party player or CDN that is not directly affiliated with the streaming service 1720. In some examples, video may be transmitted from data capture node 1710 to video streaming service 1720 and, in turn, from video streaming service 1720 to players 1750A-C and player/CDN 1751 over one or more communications networks, for example one or more local area networks (LAN's) and/or one or more wide area networks (WAN's), such as the Internet. Additionally, in some examples, video may be transmitted from data capture node 1710 to video streaming service 1720 and, in turn, from video streaming service 1720 to players 1750A-C and player/CDN 1751 using streaming transmission techniques, in which portions of transmitted content may be received and played while subsequent portions of the transmitted content are being transmitted. In some examples, the video content captured and transmitted by data capture node 1710 may include video of a live event, such as a video game, sporting event, news event, or other live event. In some examples, users may be commenting, chatting or otherwise describing actions within these live events. In these and other cases, it may be particularly advantageous to reduce and minimize latency for video of live events.

Video may be transmitted from the video streaming service 1720 using adaptive bitrate streaming, in which video is encoded into multiple different renditions 1731 (including renditions 1731A-B and potentially other renditions) having different respective image qualities (e.g., bitrates, resolutions, profiles, frame rates, etc.) and appropriate renditions are selected, and dynamically switched, for individual viewers based on changing network conditions and other characteristics. In some examples, encoder 1723 may encode the source video content received from the video capture node 1710 into the multiple different renditions 1731. In one specific example, rendition 1731A may be a 1080p resolution rendition of the video content, while rendition 1731B may be a 720p resolution rendition of the video content. The encoded renditions 1731 may then be delivered to edge node 1740 for transmission to players 1750A-C and player/CDN 1751, such as using various techniques described in detail below. The edge node 1740 is a node that transmits video content from the video streaming service 1720 to one or more players.

It is seen that video streaming service 1720 may include a transcoder 1721 that encodes the video content into multiple renditions 1731. Additionally, in some examples, the transcoder 1721 may also encode each rendition into higher and lower latency versions. In some examples, these multiple renditions 1731 and latency versions may be delivered from transcoder 1721 to edge node 1740, which may stream the video content to players 1750A-C and player/CDN 1751 over one or more networks.

In some cases, the edge node 1740 may, on a player-by-player basis, select an appropriate rendition (1080p, 720p, etc.). The edge node 1740 includes a rendition selector 1741, which may, in some examples, use quality of service data to select and switch between renditions. In some examples, when download speeds and other network conditions are high and/or improving, the rendition selector 1741 may generally maintain and/or switch to higher image quality renditions. By contrast, in some examples, when download speeds and other network conditions are low and/or deteriorating, the rendition selector 1741 may generally maintain and/or switch to lower image quality renditions.

In some examples, video capture node 1710 may capture video using screen capture software, one or more cameras, and/or other video capture components. In the example of FIG. 17, encoder 1711 of video capture node 1710 may encode the captured video for transmission to video streaming service 1720 over one or more networks. The transmitted video may be received by video streaming service 1720 and provided to transcoder 1721, at which decoder 1722 may decode the incoming video. Encoder 1723 may then re-encode the video for transmission to players 1750A-C and player/CDN 1751 over one or more networks.

Selection of renditions and rendition versions by the streaming service 1720 (e.g., by the edge node 1740) may differ from traditional adaptive bitrate streaming techniques in which rendition selection may be performed by each player/client. Selection of renditions and rendition versions by the streaming service 1720 may, for example, serve to reduce complexity and improve performance at the player/client, such as by reducing computational burden on the client to perform rendition selection. Moreover, server-side rendition selection may also improve security by allowing rendition selection algorithms, which may require investment of time and effort to create and improve, to be stored at a more secure server environment.

In order to further reduce latency, video may, in some examples, be transmitted using a protocol that does not require retransmission of lost packets, such as User Datagram Protocol (UDP) and Web Real-Time Communication (WebRTC), which is commonly used for point-to-point transmissions. In the example of FIG. 17, it is seen that video content may be transmitted from edge node 1740 to players 1750A-C using WebRTC streams 1745A-C. However, while not retransmitting lost packets may reduce latency, it may also result in transmissions being temporarily susceptible to corruptions when network conditions deteriorate, such as when packet loss rates and congestion increase. In some examples, application of FEC to the streaming video may help to reduce the extent and duration of this corruption. While non-retransmitting protocols such as WebRTC may commonly be used for point-to-point communications, the techniques described herein may, in some examples, reduce latency in broadcasting scenarios by employing these non-retransmitting protocols in a broadcasting environment. It is noted that, even in cases when WebRTC or another less reliable protocol is used to transmit video from edge node 140 to players 1750A-C, a more reliable protocol, such as hypertext transfer protocol (HTTP), may be used to transmit video between components within the video streaming service 1720, such as from encoder 1723 to edge node 1740. Thus, in some examples, video may be transmitted from encoder 1723 to edge node 1740 using HTTP protocol. The edge node 1740 may then convert and/or reformat the video from an HTTP protocol format to a WebRTC protocol format for transmission to players 1750A-C. Additionally, in some examples, a single HTTP video version received from the encoder 1723 may be transformed by the edge node 140 into multiple different WebRTC video versions, such as versions having different amounts of FEC as will be described in detail below.

FIG. 18 is a block diagram of an example of a user device 1800 suitable for use with some embodiments discussed above (e.g., a streaming device from which video content may be captured at data capture node 1710, or players such as 1750A-C). It should be understood that user device 1800 may be any of a wide variety of device types. In some embodiments, user device 1800 (depicted as a tablet device) may include one or more single or multi-core processors 1802 configured to execute stored instructions (e.g., in device memory 1820). User device 1800 may also include one or more input/output (I/O) interface(s) 1804 to allow the device to communicate with other devices. I/O interfaces 1804 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 1804 may be coupled to one or more I/O devices 1806 which may or may not be integrated with client device 1800.

User device 1800 may also include one or more communication interfaces 1808 configured to provide communications between the device and other devices. Such communication interface(s) 1808 may be used to connect to cellular networks, personal area networks (PANs), local area networks (LANs), wide area networks (WANs), and so forth. For example, communications interfaces 1808 may include radio frequency modules for a 3G, 4G, or 5G cellular network, a Wi-Fi LAN and a Bluetooth PAN. User device 1800 may also include one or more buses or other internal communications hardware or software (not shown) that allow for the transfer of data and instructions between the various modules and components of the device.

User device 1800 may also include one or more memories (e.g., memory 1810). Memory 1810 may include non-transitory computer-readable storage media that may be any of a wide variety of types of volatile and non-volatile storage media including, for example, electronic storage media, magnetic storage media, optical storage media, quantum storage media, mechanical storage media, and so forth.

Memory 1810 may provide storage for computer readable instructions, data structures, program modules and other data for the operation of user device 1800. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 1810 may include at least one operating system (OS) module 1812 configured to manage hardware resources such as I/O interfaces 1804 and provide various services to applications or modules executing on processor(s) 1802. Memory 1810 may also include a user interface module 1816, a content rendering module 1818, and other modules. Memory 1810 may also include device memory 1820 to store a wide variety of instructions and information using any of a variety of formats including, for example, flat files, databases, linked lists, trees, or other data structures. Such information includes content for rendering and display on display 1806(1) including, for example, any type of video content.

In some embodiments, display 1806(1) may be a screen configured to multiple independent interfaces or video players. In some embodiments, display 1806(1) may include one or more external screens, for example, a first screen and a second screen configured to display primary content and secondary content.

In some embodiments, a portion of device memory 1820 may be distributed across one or more other devices including servers, network attached storage devices, and so forth.

The logic used to handle overlaps between the audio components of successive periods of content (represented by 1819 in FIG. 18) may be implemented in a variety of ways, e.g., in hardware, software, and/or firmware. It will also be understood that user device 1800 of FIG. 18 is merely an example of a device with which some implementations enabled by the present disclosure may be practiced, and that a wide variety of other devices types may also be used. The scope of this disclosure should therefore not be limited by reference to device-specific details.

Embodiments of the disclosure can be described in view of the following clauses:

Clause 1. A computer-implemented method of adaptive bitrate optimization for live content delivery, the method comprising:

performing offline processing on video content by:
  obtaining content segments of the video content;
  extracting features from the content segments;
  selecting a combination of the extracted features that will have the highest impact on accuracy of prediction by a predictive model;
  determining a rate-distortion (RD) curve of a quality metric with respect to bitrate of individual ones of the content segments to form a set of RD curves;
  forming a set of RD clusters from the set of RD curves;
  mapping the combination of the extracted features to the set of RD clusters;
  applying a convex hull operation to the set of RD clusters to generate a set of bitrate ladders corresponding to the set of RD clusters; and
  generating one or more machine learning models configured to predict the set of RD clusters, the set of bitrate ladders, or a combination thereof; and performing online transcoding during a live video stream
by:
    extracting features from content segments of the live
        video stream;
    using the one or more machine learning models to
        predict an RD cluster for individual ones of the
        content segments of the live stream based on the
        features extracted from the live stream, and a bitrate
        ladder comprising an optimal bitrate corresponding
        to the RD cluster; and
    transcoding the live stream in real-time by applying the
        bitrate ladder corresponding to the predicted RD clus-
        ter.

Clause 2. The method of clause 1, wherein the features
extracted from the content segments of the live video stream
include one or more of a video content category, a quanti-
zation parameter, an original bitrate, an original resolution,
a motion vector, or coded block pattern information.

Clause 3. The method of any one of clauses 1 to 2,
wherein the RD clusters are formed using supervised learn-
ing or unsupervised learning with a Bjontegaard Delta (BD)
rate cost function.

Clause 4. The method of any one of clauses 1 to 3,
wherein the quality metric is based on a peak signal-to-noise
ratio (PSNR), a video multimethod assessment fusion
(VMAF) score, a structural similarity index measure
(SSIM), or a percentile-based quality score.

Clause 5. A computer-implemented method of adaptive
bitrate optimization for content delivery, the method com-
prising:
    extracting, in real-time, features from content segments of
        a video stream;
    for individual ones of the content segment of the video
        stream, identifying a rate-distortion (RD) cluster from
        a mapping of extracted features to RD clusters using
        one or more trained machine learning models; and
    transcoding the video stream by applying, to the content
        segments, a transcoding ladder having bitrate informa-
        tion corresponding to the identified RD cluster.

Clause 6. The computer-implemented method of clause 5,
further comprising:
    generating augmented features by statistically fitting the
        extracted features, and
    determining a set of augmented features having the high-
        est impact on accuracy of prediction of the RD cluster,
        wherein the mapping of the extracted features to the
        RD clusters comprises a mapping of the set of aug-
        mented features to the RD clusters using the one or
        more trained machine learning models.

Clause 7. The computer-implemented method of any one
of clauses 5 to 6, wherein the transcoding ladder further
includes resolution and codec information.

Clause 8. The computer-implemented method of any one
of clauses 5 to 7, wherein the extracted features include a
quantization parameter, an original bitrate, an original reso-
lution, a motion vector, coded block pattern information, or
a combination thereof.

Clause 9. The computer-implemented method of any one
of clauses 5 to 8, wherein the extracted features include a
category of the live video stream.

Clause 10. The computer-implemented method of any one
of clauses 5 to 9, wherein the bitrate ladder corresponding to
an identified RD cluster to a current content segment of the
live video stream is applied to a subsequent content segment
of the live video stream within one frame interval to effect
a change in bitrate in the subsequent content segment within
the one frame interval.

Clause 11. The computer-implemented method of any one
of clauses 5 to 10, wherein the extracted features are
extracted from a predetermined subset of frames from the
individual content segment.

Clause 12. The computer-implemented method of any one
of clauses 5 to 11, wherein transcoding the live video stream
includes limiting a bitrate change between sequential con-
tent segments.

Clause 13. The computer-implemented method of any one
of clauses 5 to 13, wherein the mapping of the extracted
features to the RD clusters is generated offline.

Clause 14. A non-transitory computer-readable apparatus
comprising a storage medium, the storage medium compris-
ing a plurality of computer-executable instructions config-
ured to, when executed by one or more processors, cause a
computerized apparatus to:
    extract, in real-time, features from content segments of a
        video stream;
    for individual ones of the content segment of the live
        video stream, identify a rate-distortion (RD) cluster
        from a mapping of the extracted features to RD clusters
        using one or more trained machine learning models;
        and
    transcode the live video stream by applying, to the content
        segments, a transcoding ladder having bitrate informa-
        tion corresponding to the identified RD cluster.

Clause 15. The non-transitory computer-readable appara-
tus of clause 14, wherein:
    the extraction of the features includes statistical fitting of
        at least portions of the features, and determination of a
        combination of the statistically fitted features having
        the highest impact on accuracy of prediction of the RD
        cluster; and
    the mapping of the extracted features to the RD clusters
        comprises a mapping of the combination of the statis-
        tically fitted features having the highest impact to the
        RD clusters using the one or more trained machine
        learning models.

Clause 16. The non-transitory computer-readable appara-
tus of any one of clauses 14 to 15, wherein the transcoding
ladder further includes resolution and codec information.

Clause 17. The non-transitory computer-readable appara-
tus of any one of clauses 14 to 16, wherein the extracted
features include a quantization parameter, an original bitrate,
an original resolution, a motion vector, coded block pattern
information, or a combination thereof.

Clause 18. The non-transitory computer-readable appara-
tus of any one of clauses 14 to 18, wherein the transcoding
ladder corresponding to an identified RD cluster to a current
content segment of the live video stream is applied to a
subsequent content segment of the live video stream within
one frame interval to effect a change in bitrate in the
subsequent content segment within the one frame interval.

Clause 19. The non-transitory computer-readable appara-
tus of any one of clauses 14 to 18, wherein transcoding the
live video stream includes limiting a bitrate change between
sequential content segments.

Clause 20. The non-transitory computer-readable appara-
tus of any one of clauses 14 to 19, wherein the mapping of
the extracted features to the RD clusters is generated offline.

Clause 21. A computer-implemented method for adaptive
optimization of clusters for bitrate prediction, the method
comprising:
    training a machine learning model to obtain a mapping of
        features associated with video content to clusters rep-
        resenting optimal bitrates;

applying the mapping to the video content to determine a prediction accuracy of an individual cluster;

comparing the prediction accuracy of the individual cluster to an accuracy threshold;

forming superclusters by merging clusters having the prediction accuracy below the accuracy threshold with other clusters;

extracting the features from content segments of a live video stream;

identifying a set of superclusters for the content segments of the live video stream based on the extracted features, the set of superclusters associated with respective optimal bitrates for the content segments;

assigning a subcluster between the identified set of superclusters, the subcluster configured to reduce bitrate fluctuation of the respective optimal bitrates associated with the set of superclusters; and applying the respective optimal bitrates associated with the set of superclusters and a bitrate associated with the subcluster to the live video stream.

Clause 22. The method of clause 21, wherein clusters being merged into a supercluster are respectively assigned a weight based on the prediction accuracy of the cluster, and an optimal bitrate represented by the supercluster is a weighted sum of optimal bitrates corresponding to the clusters being merged into the supercluster.

Clause 23. The method of any one of clauses 21 to 22, wherein the accuracy threshold varies with resolution, frame rate, or motion, or a combination thereof, associated with the content segments.

Clause 24. The method of any one of clauses 21 to 23, wherein a number of subclusters between superclusters varies with resolution of the content segments of the live video stream, a difference between respective bitrates associated with the set of superclusters as compared to a threshold, or a combination thereof.

Clause 25. A computer-implemented method for adaptive optimization of clusters for bitrate prediction, the method comprising:

extracting, in real-time, features from content segments of a video stream;

identifying superclusters representing optimal bitrates for the content segments of the live video stream based on a mapping of the features to superclusters generated by one or more trained machine learning models, the identified superclusters configured to maintain a quality level associated with the content segments;

assigning a subcluster between the identified superclusters; and applying bitrates associated with the identified superclusters and the subcluster to the video stream.

Clause 26. The method of clause 25, further comprising forming the superclusters by merging candidate clusters having prediction accuracies below an accuracy threshold.

Clause 27. The method of clause 26, wherein the accuracy threshold is determined based on video resolution, frame rate, motion, or a combination thereof, associated with the content segments.

Clause 28. The method of clause 26, wherein the accuracy threshold is determined based on content complexity, bitrate efficiency, a user-provided metric, or a combination thereof.

Clause 29. The method of any one of clauses 26 to 28, wherein individual ones of the optimal bitrates represented by the superclusters is based on a weighted sum of optimal bitrates of candidate clusters being merged into a respective supercluster.

Clause 30. The method of any one of clauses 26 to 28, wherein the candidate clusters being merged are identified based on historical information associated with the candidate clusters.

Clause 31. The method of any one of clauses 25 to 30, wherein the subcluster is inserted between adjacent ones of the identified superclusters to reduce fluctuation of the bitrates associated with the superclusters, reduce buffering associated with the content segments, reduce a time to play the video stream, or a combination thereof.

Clause 32. The method of clause 31, wherein a number of subclusters inserted between the adjacent ones of the identified superclusters is determined based on a video resolution, a difference between the bitrates associated with the superclusters as compared to a threshold, or a combination thereof.

Clause 33. The method of any one of clauses 25 to 32, wherein the subcluster is identified based on historical information associated with cluster predictions made by the trained machine learning model.

Clause 34. The method of any one of clauses 25 to 33, wherein the features include one or more of a video content category, a quantization parameter, an original bitrate, an original resolution, a motion vector, or coded block pattern information.

Clause 35. The method of any one of clauses 25 to 34, wherein the features are extracted from a subset of frames at a start of the content segments.

Clause 36. A non-transitory computer-readable apparatus comprising a storage medium, the storage medium comprising a plurality of computer-executable instructions configured to, when executed by one or more processors, cause a computerized apparatus to:

extract, in real-time, features from content segments of a video stream;

identify superclusters representing optimal bitrates for the content segments of the live video stream based on a mapping of the features to superclusters generated by one or more trained machine learning models;

assign a subcluster between the identified superclusters; and apply bitrates associated with the identified superclusters and the subcluster to the video stream.

Clause 37. The non-transitory computer-readable apparatus of clause 36, wherein the plurality of computer-executable instructions are further configured to, when executed by one or more processors, cause the computerized apparatus to form the superclusters by merging candidate clusters having prediction accuracies below an accuracy threshold.

Clause 38. The non-transitory computer-readable apparatus of clause 37, wherein the accuracy threshold is determined based on video resolution, frame rate, motion, or a combination thereof, associated with the content segments.

Clause 39. The non-transitory computer-readable apparatus of any one of clauses 35 to 38, wherein the subcluster is inserted between adjacent ones of the identified superclusters to reduce fluctuation of the bitrates associated with the superclusters, reduce buffering associated with the content segments, reduce a time to play the video stream, or a combination thereof.

Clause 40. The non-transitory computer-readable apparatus of clause 39, wherein a number of subclusters inserted between the adjacent ones of the identified superclusters is determined based on a video resolution, a difference between the bitrates associated with the superclusters as compared to a threshold, or a combination thereof.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method for adaptive optimization of clusters for bitrate prediction, the method comprising:

training a machine learning model to obtain a mapping of features associated with video content to clusters representing optimal bitrates;

applying the mapping to the video content to determine a prediction accuracy of an individual cluster;

comparing the prediction accuracy of the individual cluster to an accuracy threshold;

forming superclusters by merging clusters having the prediction accuracy below the accuracy threshold with other clusters;

extracting the features from content segments of a live video stream;

identifying a set of superclusters for the content segments of the live video stream based on the extracted features, the set of superclusters associated with respective optimal bitrates for the content segments;

assigning a subcluster between the identified set of superclusters, the subcluster configured to reduce bitrate fluctuation of the respective optimal bitrates associated with the set of superclusters; and transcoding the live video stream based on the respective optimal bitrates associated with the set of superclusters and a bitrate associated with the subcluster.

2. The computer-implemented method of claim 1, wherein clusters being merged into a supercluster are respectively assigned a weight based on the prediction accuracy of the cluster, and an optimal bitrate represented by the supercluster is a weighted sum of optimal bitrates corresponding to the clusters being merged into the supercluster.

3. The computer-implemented method of claim 1, wherein the accuracy threshold varies with resolution, frame rate, or motion, or a combination thereof, associated with the content segments.

4. The computer-implemented method of claim 1, wherein a number of subclusters between superclusters varies with resolution of the content segments of the live video stream, a difference between respective bitrates associated with the set of superclusters as compared to a threshold, or a combination thereof.

5. A computer-implemented method for adaptive optimization of clusters for bitrate prediction, the method comprising:

extracting, in real-time, features from content segments of a video stream;

identifying superclusters representing optimal bitrates for the content segments of the live video stream based on a mapping of the features to superclusters generated by one or more trained machine learning models, the identified superclusters configured to maintain a quality level associated with the content segments;

assigning a subcluster between the identified superclusters; and transcoding the video stream based on a set of bitrates associated with the identified superclusters and the subcluster.

6. The computer-implemented method of claim 5, further comprising forming the superclusters by merging candidate clusters having prediction accuracies below an accuracy threshold.

7. The computer-implemented method of claim 6, wherein the accuracy threshold is determined based on video resolution, frame rate, motion, or a combination thereof, associated with the content segments.

8. The computer-implemented method of claim 6, wherein the accuracy threshold is determined based on content complexity, bitrate efficiency, a user-provided metric, or a combination thereof.

9. The computer-implemented method of claim 6, wherein individual ones of the optimal bitrates represented by the superclusters is based on a weighted sum of optimal bitrates of candidate clusters being merged into a respective supercluster.

10. The computer-implemented method of claim 6, wherein the candidate clusters being merged are identified based on historical information associated with the candidate clusters.

11. The computer-implemented method of claim 5, wherein the subcluster is inserted between adjacent ones of the identified superclusters to reduce fluctuation of the bitrates associated with the superclusters, reduce buffering associated with the content segments, reduce a time to play the video stream, or a combination thereof.

12. The computer-implemented method of claim 11, wherein a number of subclusters inserted between the adjacent ones of the identified superclusters is determined based on a video resolution, a difference between the bitrates associated with the superclusters as compared to a threshold, or a combination thereof.

13. The computer-implemented method of claim 5, wherein the subcluster is identified based on historical information associated with cluster predictions made by the trained machine learning model.

14. The computer-implemented method of claim 5, wherein the features include one or more of a video content category, a quantization parameter, an original bitrate, an original resolution, a motion vector, or coded block pattern information.

15. The computer-implemented method of claim 5, wherein the features are extracted from a subset of frames at a start of the content segments.

16. A non-transitory computer-readable apparatus comprising a storage medium, the storage medium comprising a plurality of computer-executable instructions configured to, when executed by one or more processors, cause a computerized apparatus to:

extract, in real-time, features from content segments of a video stream;

identify superclusters representing optimal bitrates for the content segments of the live video stream based on a mapping of the features to superclusters generated by one or more trained machine learning models;

assign a subcluster between the identified superclusters; and transcoding the video stream based on a set of bitrates associated with the identified superclusters and the subcluster.

17. The non-transitory computer-readable apparatus of claim 16, wherein the plurality of computer-executable instructions are further configured to, when executed by one or more processors, cause the computerized apparatus to form the superclusters by merging candidate clusters having prediction accuracies below an accuracy threshold.

18. The non-transitory computer-readable apparatus of claim 17, wherein the accuracy threshold is determined based on video resolution, frame rate, motion, or a combination thereof, associated with the content segments.

19. The non-transitory computer-readable apparatus of claim 16, wherein the subcluster is inserted between adjacent ones of the identified superclusters to reduce fluctuation of the bitrates associated with the superclusters, reduce buffering associated with the content segments, reduce a time to play the video stream, or a combination thereof.

20. The non-transitory computer-readable apparatus of claim 19, wherein a number of subclusters inserted between the adjacent ones of the identified superclusters is determined based on a video resolution, a difference between the bitrates associated with the superclusters as compared to a threshold, or a combination thereof.

\* \* \* \* \*